United States Patent
O'Krafka et al.

(10) Patent No.: US 9,626,399 B2
(45) Date of Patent: Apr. 18, 2017

(54) CONDITIONAL UPDATES FOR REDUCING FREQUENCY OF DATA MODIFICATION OPERATIONS

(71) Applicant: SanDisk Enterprise IP LLC, Milpitas, CA (US)

(72) Inventors: Brian W. O'Krafka, Austin, TX (US); Patrick Chiu, Cupertino, CA (US); Ramesh Chander, Bangalore (IN); Zhengheng Wang, Hangzhou (CN)

(73) Assignee: SANDISK TECHNOLOGIES LLC, Plano, TX (US)

( * ) Notice: Subject to any disclaimer, the term of this patent is extended or adjusted under 35 U.S.C. 154(b) by 208 days.

(21) Appl. No.: 14/336,949

(22) Filed: Jul. 21, 2014

(65) Prior Publication Data

US 2015/0278283 A1 Oct. 1, 2015

Related U.S. Application Data

(60) Provisional application No. 61/973,174, filed on Mar. 31, 2014.

(51) Int. Cl.
*G06F 17/30* (2006.01)
(52) U.S. Cl.
CPC .............................. *G06F 17/30327* (2013.01)
(58) Field of Classification Search
CPC ......... G06F 17/30958; G06F 17/30961; G06F 17/30952; G06F 17/30946; G06F 12/0873;
(Continued)

(56) References Cited

U.S. PATENT DOCUMENTS

| 4,173,737 A | 11/1979 | Skerlos et al. |
| 4,888,750 A | 12/1989 | Kryder et al. |

(Continued)

FOREIGN PATENT DOCUMENTS

| EP | 1 299 800 | 4/2003 |
| EP | 1 465 203 A1 | 10/2004 |

(Continued)

OTHER PUBLICATIONS

David E. Ferguson, "Bit-Tree: A Data Structure for Fast File Processing", May 1992, Communications of the ACM: vol. 35 Issue 6, Jun. 1992, pp. 114-120.*

(Continued)

*Primary Examiner* — Cheryl Lewis
(74) *Attorney, Agent, or Firm* — Morgan, Lewis & Bockius LLP

(57) ABSTRACT

A computer system detects a request, from a requestor, to access a first data object stored in a tiered data structure that includes internal nodes and leaf nodes. In response to detecting the request to access the first data object, the computer system retrieves a leaf node that includes the first data object and locks the leaf node that includes the first data object. While the leaf node that includes the first data object is locked, the computer system transmits, to the requestor, a first conditional-update communication and detecting a first conditional-update response in response to the first conditional-update communication. In response to detecting the first conditional-update response corresponding to the first data object, the computer system performs one or more operations based on the first conditional-update response corresponding to the first data object before unlocking the leaf node that includes the first data object.

21 Claims, 20 Drawing Sheets

(58) Field of Classification Search
CPC ............ G06F 12/0897; G06F 12/0893; G06F 12/0815; G06F 12/0824; G06F 17/30362; G06F 17/30327; G06F 17/30292
See application file for complete search history.

(56) References Cited

U.S. PATENT DOCUMENTS

| | | | |
|---|---|---|---|
| 4,916,652 A | 4/1990 | Schwarz et al. | |
| 5,129,089 A | 7/1992 | Nielsen | |
| 5,270,979 A | 12/1993 | Harari et al. | |
| 5,329,491 A | 7/1994 | Brown et al. | |
| 5,381,528 A | 1/1995 | Brunelle | |
| 5,404,485 A | 4/1995 | Ban | |
| 5,488,702 A | 1/1996 | Byers et al. | |
| 5,519,847 A | 5/1996 | Fandrich et al. | |
| 5,530,705 A | 6/1996 | Malone | |
| 5,537,555 A | 7/1996 | Landry | |
| 5,551,003 A | 8/1996 | Mattson et al. | |
| 5,636,342 A | 6/1997 | Jeffries | |
| 5,657,332 A | 8/1997 | Auclair et al. | |
| 5,666,114 A | 9/1997 | Brodie et al. | |
| 5,708,849 A | 1/1998 | Coke et al. | |
| 5,765,185 A | 6/1998 | Lambrache et al. | |
| 5,890,193 A | 3/1999 | Chevallier | |
| 5,930,188 A | 7/1999 | Roohparvar | |
| 5,936,884 A | 8/1999 | Hasbun et al. | |
| 5,943,692 A | 8/1999 | Marberg et al. | |
| 5,946,714 A | 8/1999 | Miyauchi | |
| 5,982,664 A | 11/1999 | Watanabe | |
| 6,000,006 A | 12/1999 | Bruce et al. | |
| 6,006,345 A | 12/1999 | Berry, Jr. | |
| 6,016,560 A | 1/2000 | Wada et al. | |
| 6,018,304 A | 1/2000 | Bessios | |
| 6,044,472 A | 3/2000 | Crohas | |
| 6,070,074 A | 5/2000 | Perahia et al. | |
| 6,104,304 A | 8/2000 | Clark et al. | |
| 6,119,250 A | 9/2000 | Nishimura et al. | |
| 6,138,261 A | 10/2000 | Wilcoxson et al. | |
| 6,182,264 B1 | 1/2001 | Ott | |
| 6,192,092 B1 | 2/2001 | Dizon et al. | |
| 6,260,120 B1 | 7/2001 | Blumenau et al. | |
| 6,295,592 B1 | 9/2001 | Jeddeloh et al. | |
| 6,311,263 B1 | 10/2001 | Barlow et al. | |
| 6,408,394 B1 | 6/2002 | Vander Kamp et al. | |
| 6,412,042 B1 | 6/2002 | Paterson et al. | |
| 6,442,076 B1 | 8/2002 | Roohparvar | |
| 6,449,625 B1 | 9/2002 | Wang | |
| 6,484,224 B1 | 11/2002 | Robins et al. | |
| 6,516,437 B1 | 2/2003 | Van Stralen et al. | |
| 6,564,285 B1 | 5/2003 | Mills et al. | |
| 6,647,387 B1 | 11/2003 | McKean et al. | |
| 6,678,788 B1 | 1/2004 | O'Connell | |
| 6,728,879 B1 | 4/2004 | Atkinson | |
| 6,757,768 B1 | 6/2004 | Potter et al. | |
| 6,775,792 B2 | 8/2004 | Ulrich et al. | |
| 6,810,440 B2 | 10/2004 | Micalizzi, Jr. et al. | |
| 6,836,808 B2 | 12/2004 | Bunce et al. | |
| 6,836,815 B1 | 12/2004 | Purcell et al. | |
| 6,842,436 B2 | 1/2005 | Moeller | |
| 6,865,650 B1 | 3/2005 | Morley et al. | |
| 6,871,257 B2 | 3/2005 | Conley et al. | |
| 6,895,464 B2 | 5/2005 | Chow et al. | |
| 6,934,755 B1 | 8/2005 | Saulpaugh et al. | |
| 6,966,006 B2 | 11/2005 | Pacheco et al. | |
| 6,978,343 B1 | 12/2005 | Ichiriu | |
| 6,980,985 B1 | 12/2005 | Amer-Yahia et al. | |
| 6,981,205 B2 | 12/2005 | Fukushima et al. | |
| 6,988,171 B2 | 1/2006 | Beardsley et al. | |
| 7,020,017 B2 | 3/2006 | Chen et al. | |
| 7,024,514 B2 | 4/2006 | Mukaida et al. | |
| 7,028,165 B2 | 4/2006 | Roth et al. | |
| 7,032,123 B2 | 4/2006 | Kane et al. | |
| 7,043,505 B1 | 5/2006 | Teague et al. | |
| 7,076,598 B2 | 7/2006 | Wang | |
| 7,100,002 B2 | 8/2006 | Shrader et al. | |
| 7,102,860 B2 | 9/2006 | Wenzel | |
| 7,111,293 B1 | 9/2006 | Hersh et al. | |
| 7,126,873 B2 | 10/2006 | See et al. | |
| 7,133,282 B2 | 11/2006 | Sone | |
| 7,155,579 B1 | 12/2006 | Neils et al. | |
| 7,162,678 B2 | 1/2007 | Saliba | |
| 7,173,852 B2 | 2/2007 | Gorobets et al. | |
| 7,184,446 B2 | 2/2007 | Rashid et al. | |
| 7,212,440 B2 | 5/2007 | Gorobets | |
| 7,269,755 B2 | 9/2007 | Moshayedi et al. | |
| 7,275,170 B2 | 9/2007 | Suzuki | |
| 7,295,479 B2 | 11/2007 | Yoon et al. | |
| 7,328,377 B1 | 2/2008 | Lewis et al. | |
| 7,426,633 B2 | 9/2008 | Thompson et al. | |
| 7,486,561 B2 | 2/2009 | Mokhlesi | |
| 7,516,292 B2 | 4/2009 | Kimura et al. | |
| 7,523,157 B2 | 4/2009 | Aguilar, Jr. et al. | |
| 7,527,466 B2 | 5/2009 | Simmons | |
| 7,529,466 B2 | 5/2009 | Takahashi | |
| 7,533,214 B2 | 5/2009 | Aasheim et al. | |
| 7,546,478 B2 | 6/2009 | Kubo et al. | |
| 7,566,987 B2 | 7/2009 | Black et al. | |
| 7,571,277 B2 | 8/2009 | Mizushima | |
| 7,574,554 B2 | 8/2009 | Tanaka et al. | |
| 7,596,643 B2 | 9/2009 | Merry et al. | |
| 7,669,003 B2 | 2/2010 | Sinclair et al. | |
| 7,681,106 B2 | 3/2010 | Jarrar et al. | |
| 7,685,494 B1 | 3/2010 | Varnica et al. | |
| 7,707,481 B2 | 4/2010 | Kirschner et al. | |
| 7,761,655 B2 | 7/2010 | Mizushima et al. | |
| 7,765,454 B2 | 7/2010 | Passint | |
| 7,774,390 B2 | 8/2010 | Shin | |
| 7,809,836 B2 | 10/2010 | Mihm et al. | |
| 7,840,762 B2 | 11/2010 | Oh et al. | |
| 7,870,326 B2 | 1/2011 | Shin et al. | |
| 7,890,818 B2 | 2/2011 | Kong et al. | |
| 7,913,022 B1 | 3/2011 | Baxter | |
| 7,925,960 B2 | 4/2011 | Ho et al. | |
| 7,934,052 B2 | 4/2011 | Prins et al. | |
| 7,945,825 B2 | 5/2011 | Cohen et al. | |
| 7,954,041 B2 | 5/2011 | Hong et al. | |
| 7,971,112 B2 | 6/2011 | Murata | |
| 7,974,368 B2 | 7/2011 | Shieh et al. | |
| 7,978,516 B2 | 7/2011 | Olbrich | |
| 7,996,642 B1 | 8/2011 | Smith | |
| 8,006,161 B2 | 8/2011 | Lestable et al. | |
| 8,032,724 B1 | 10/2011 | Smith | |
| 8,041,884 B2 | 10/2011 | Chang | |
| 8,042,011 B2 | 10/2011 | Nicolaidis et al. | |
| 8,069,390 B2 | 11/2011 | Lin | |
| 8,190,967 B2 | 5/2012 | Hong et al. | |
| 8,250,380 B2 | 8/2012 | Guyot | |
| 8,254,181 B2 | 8/2012 | Hwang et al. | |
| 8,259,506 B1 | 9/2012 | Sommer et al. | |
| 8,261,020 B2* | 9/2012 | Krishnaprasad | G06F 12/0813 711/118 |
| 8,312,349 B2 | 11/2012 | Reche et al. | |
| 8,385,117 B2 | 2/2013 | Sakurada et al. | |
| 8,412,985 B1 | 4/2013 | Bowers et al. | |
| 8,429,436 B2 | 4/2013 | Fillingim et al. | |
| 8,438,459 B2 | 5/2013 | Cho et al. | |
| 8,453,022 B2 | 5/2013 | Katz | |
| 8,473,680 B1 | 6/2013 | Pruthi | |
| 8,510,499 B1* | 8/2013 | Banerjee | G06F 12/0246 711/103 |
| 8,531,888 B2 | 9/2013 | Chilappagari et al. | |
| 8,554,984 B2 | 10/2013 | Yano et al. | |
| 8,627,117 B2 | 1/2014 | Johnston | |
| 8,634,248 B1 | 1/2014 | Sprouse et al. | |
| 8,694,854 B1 | 4/2014 | Dar et al. | |
| 8,724,789 B2 | 5/2014 | Altberg et al. | |
| 8,775,741 B1 | 7/2014 | de la Iglesia | |
| 8,788,778 B1 | 7/2014 | Boyle | |
| 8,832,384 B1 | 9/2014 | de la Iglesia | |
| 8,874,992 B2 | 10/2014 | Desireddi et al. | |
| 8,885,434 B2 | 11/2014 | Kumar | |
| 8,898,373 B1 | 11/2014 | Kang et al. | |
| 8,909,894 B1 | 12/2014 | Singh et al. | |
| 8,910,030 B2 | 12/2014 | Goel | |

(56) References Cited

U.S. PATENT DOCUMENTS

| | | |
|---|---|---|
| 8,923,066 B1 | 12/2014 | Subramanian et al. |
| 9,043,517 B1 | 5/2015 | Sprouse et al. |
| 9,128,690 B2 | 9/2015 | Lotzenburger et al. |
| 9,329,789 B1 | 5/2016 | Chu et al. |
| 2001/0026949 A1 | 10/2001 | Ogawa et al. |
| 2001/0050824 A1 | 12/2001 | Buch |
| 2002/0024846 A1 | 2/2002 | Kawahara et al. |
| 2002/0032891 A1 | 3/2002 | Yada et al. |
| 2002/0036515 A1 | 3/2002 | Eldridge et al. |
| 2002/0083299 A1 | 6/2002 | Van Huben et al. |
| 2002/0099904 A1 | 7/2002 | Conley |
| 2002/0116651 A1 | 8/2002 | Beckert et al. |
| 2002/0122334 A1 | 9/2002 | Lee et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid |
| 2003/0079172 A1 | 4/2003 | Yamagishi et al. |
| 2003/0088805 A1 | 5/2003 | Majni et al. |
| 2003/0093628 A1 | 5/2003 | Matter et al. |
| 2003/0163594 A1 | 8/2003 | Aasheim et al. |
| 2003/0163629 A1 | 8/2003 | Conley et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0204341 A1 | 10/2003 | Guliani et al. |
| 2003/0212719 A1 | 11/2003 | Yasuda et al. |
| 2003/0225961 A1 | 12/2003 | Chow et al. |
| 2004/0024957 A1 | 2/2004 | Lin et al. |
| 2004/0024963 A1 | 2/2004 | Talagala et al. |
| 2004/0057575 A1 | 3/2004 | Zhang et al. |
| 2004/0062157 A1 | 4/2004 | Kawabe |
| 2004/0073829 A1 | 4/2004 | Olarig |
| 2004/0085849 A1 | 5/2004 | Myoung et al. |
| 2004/0114265 A1 | 6/2004 | Talbert |
| 2004/0143710 A1 | 7/2004 | Walmsley |
| 2004/0148561 A1 | 7/2004 | Shen et al. |
| 2004/0153902 A1 | 8/2004 | Machado et al. |
| 2004/0158775 A1 | 8/2004 | Shibuya et al. |
| 2004/0167898 A1 | 8/2004 | Margolus et al. |
| 2004/0181734 A1 | 9/2004 | Saliba |
| 2004/0199714 A1 | 10/2004 | Estakhri et al. |
| 2004/0210706 A1 | 10/2004 | In et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0108588 A1 | 5/2005 | Yuan |
| 2005/0114587 A1 | 5/2005 | Chou et al. |
| 2005/0138442 A1 | 6/2005 | Keller, Jr. et al. |
| 2005/0144358 A1 | 6/2005 | Conley et al. |
| 2005/0144361 A1 | 6/2005 | Gonzalez et al. |
| 2005/0144367 A1 | 6/2005 | Sinclair |
| 2005/0144516 A1 | 6/2005 | Gonzalez et al. |
| 2005/0154825 A1 | 7/2005 | Fair |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0210348 A1 | 9/2005 | Totsuka |
| 2005/0231765 A1 | 10/2005 | So et al. |
| 2005/0249013 A1 | 11/2005 | Janzen et al. |
| 2005/0251617 A1 | 11/2005 | Sinclair et al. |
| 2005/0257120 A1 | 11/2005 | Gorobets et al. |
| 2005/0273560 A1 | 12/2005 | Hulbert et al. |
| 2005/0281088 A1 | 12/2005 | Ishidoshiro et al. |
| 2005/0289314 A1 | 12/2005 | Adusumilli et al. |
| 2006/0010174 A1 | 1/2006 | Nguyen et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0062054 A1 | 3/2006 | Hamilton et al. |
| 2006/0069932 A1 | 3/2006 | Oshikawa et al. |
| 2006/0085671 A1 | 4/2006 | Majni et al. |
| 2006/0087893 A1 | 4/2006 | Nishihara et al. |
| 2006/0103480 A1 | 5/2006 | Moon et al. |
| 2006/0107181 A1 | 5/2006 | Dave et al. |
| 2006/0136570 A1 | 6/2006 | Pandya |
| 2006/0136655 A1 | 6/2006 | Gorobets et al. |
| 2006/0136681 A1 | 6/2006 | Jain et al. |
| 2006/0156177 A1 | 7/2006 | Kottapalli et al. |
| 2006/0184738 A1 | 8/2006 | Bridges et al. |
| 2006/0195650 A1 | 8/2006 | Su et al. |
| 2006/0209592 A1 | 9/2006 | Li et al. |
| 2006/0224841 A1 | 10/2006 | Terai et al. |
| 2006/0244049 A1 | 11/2006 | Yaoi et al. |
| 2006/0259528 A1 | 11/2006 | Dussud et al. |
| 2006/0265568 A1 | 11/2006 | Burton |
| 2006/0291301 A1 | 12/2006 | Ziegelmayer |
| 2007/0011413 A1 | 1/2007 | Nonaka et al. |
| 2007/0033376 A1 | 2/2007 | Sinclair et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0088716 A1 | 4/2007 | Brumme et al. |
| 2007/0091677 A1 | 4/2007 | Lasser et al. |
| 2007/0101096 A1 | 5/2007 | Gorobets |
| 2007/0106679 A1 | 5/2007 | Perrin et al. |
| 2007/0113019 A1 | 5/2007 | Beukema |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0156842 A1 | 7/2007 | Vermeulen et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0180346 A1 | 8/2007 | Murin |
| 2007/0191993 A1 | 8/2007 | Wyatt |
| 2007/0201274 A1 | 8/2007 | Yu et al. |
| 2007/0204128 A1 | 8/2007 | Lee et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0245099 A1 | 10/2007 | Gray et al. |
| 2007/0263442 A1 | 11/2007 | Cornwell et al. |
| 2007/0268754 A1 | 11/2007 | Lee et al. |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0013390 A1 | 1/2008 | Zipprich-Rasch |
| 2008/0019182 A1 | 1/2008 | Yanagidaira et al. |
| 2008/0022163 A1 | 1/2008 | Tanaka et al. |
| 2008/0028275 A1 | 1/2008 | Chen et al. |
| 2008/0043871 A1 | 2/2008 | Latouche et al. |
| 2008/0052446 A1 | 2/2008 | Lasser et al. |
| 2008/0052451 A1 | 2/2008 | Pua et al. |
| 2008/0056005 A1 | 3/2008 | Aritome |
| 2008/0059602 A1 | 3/2008 | Matsuda et al. |
| 2008/0071971 A1 | 3/2008 | Kim et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0112226 A1 | 5/2008 | Mokhlesi |
| 2008/0141043 A1 | 6/2008 | Flynn et al. |
| 2008/0144371 A1 | 6/2008 | Yeh et al. |
| 2008/0147714 A1 | 6/2008 | Breternitz et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0180084 A1 | 7/2008 | Dougherty et al. |
| 2008/0209282 A1 | 8/2008 | Lee et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |

(56) References Cited

U.S. PATENT DOCUMENTS

| | | |
|---|---|---|
| 2008/0282128 A1 | 11/2008 | Lee et al. |
| 2008/0285351 A1 | 11/2008 | Shlick et al. |
| 2008/0313132 A1 | 12/2008 | Hao et al. |
| 2008/0320110 A1 | 12/2008 | Pathak |
| 2009/0003046 A1 | 1/2009 | Nirschl et al. |
| 2009/0003058 A1 | 1/2009 | Kang |
| 2009/0019216 A1 | 1/2009 | Yamada et al. |
| 2009/0031083 A1 | 1/2009 | Willis et al. |
| 2009/0037652 A1 | 2/2009 | Yu et al. |
| 2009/0070608 A1 | 3/2009 | Kobayashi |
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0158288 A1 | 6/2009 | Fulton et al. |
| 2009/0168525 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/9172258 | 7/2009 | Olbrich at al. |
| 2009/0204823 A1 | 8/2009 | Giordano et al. |
| 2009/0207660 A1 | 8/2009 | Hwang et al. |
| 2009/0213649 A1 | 8/2009 | Takahashi et al. |
| 2009/0222708 A1 | 9/2009 | Yamaga |
| 2009/0228761 A1 | 9/2009 | Perlmutter et al. |
| 2009/0235128 A1 | 9/2009 | Eun et al. |
| 2009/0249160 A1 | 10/2009 | Gao et al. |
| 2009/0251962 A1 | 10/2009 | Yun et al. |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1 | 1/2010 | Cagno et al. |
| 2010/0020620 A1 | 1/2010 | Kim et al. |
| 2010/0037012 A1 | 2/2010 | Yano et al. |
| 2010/0054034 A1 | 3/2010 | Furuta et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0110798 A1 | 5/2010 | Hoei et al. |
| 2010/0115206 A1 | 5/2010 | de la Iglesia et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0185807 A1 | 7/2010 | Meng et al. |
| 2010/0199027 A1 | 8/2010 | Pucheral et al. |
| 2010/0199125 A1 | 8/2010 | Reche |
| 2010/0199138 A1 | 8/2010 | Rho |
| 2010/0202196 A1 | 8/2010 | Lee et al. |
| 2010/0202239 A1 | 8/2010 | Moshayedi et al. |
| 2010/0208521 A1 | 8/2010 | Kim et al. |
| 2010/0257379 A1 | 10/2010 | Wang et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0306222 A1 | 12/2010 | Freedman et al. |
| 2010/0332858 A1 | 12/2010 | Trantham et al. |
| 2010/0332863 A1 | 12/2010 | Johnston |
| 2011/0010514 A1 | 1/2011 | Benhase et al. |
| 2011/0022779 A1 | 1/2011 | Lund et al. |
| 2011/0022819 A1 | 1/2011 | Post et al. |
| 2011/0051513 A1 | 3/2011 | Shen et al. |
| 2011/0066597 A1 | 3/2011 | Mashtizadeh et al. |
| 2011/0066806 A1 | 3/2011 | Chhugani et al. |
| 2011/0072207 A1 | 3/2011 | Jin et al. |
| 2011/0072302 A1 | 3/2011 | Sartore |
| 2011/0078407 A1 | 3/2011 | Lewis |
| 2011/0078496 A1 | 3/2011 | Jeddeloh |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0131444 A1 | 6/2011 | Buch et al. |
| 2011/0138260 A1 | 6/2011 | Savin |
| 2011/0173378 A1 | 7/2011 | Filor et al. |
| 2011/0179249 A1 | 7/2011 | Hsiao |
| 2011/0199825 A1 | 8/2011 | Han et al. |
| 2011/0205823 A1 | 8/2011 | Hemink et al. |
| 2011/0213920 A1 | 9/2011 | Frost et al. |
| 2011/0222342 A1 | 9/2011 | Yoon et al. |
| 2011/0225346 A1 | 9/2011 | Goss et al. |
| 2011/0225347 A1 | 9/2011 | Goss et al. |
| 2011/0228601 A1 | 9/2011 | Olbrich et al. |
| 2011/0231600 A1 | 9/2011 | Tanaka et al. |
| 2011/0239077 A1 | 9/2011 | Bai et al. |
| 2011/0264843 A1 | 10/2011 | Haines et al. |
| 2011/0271040 A1 | 11/2011 | Kamizono |
| 2011/0283119 A1 | 11/2011 | Szu et al. |
| 2011/0289125 A1 | 11/2011 | Guthery |
| 2011/0320733 A1 | 12/2011 | Sanford et al. |
| 2012/0011393 A1 | 1/2012 | Roberts et al. |
| 2012/0017053 A1 | 1/2012 | Yang et al. |
| 2012/0023144 A1 | 1/2012 | Rub |
| 2012/0026799 A1 | 2/2012 | Lee |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0117317 A1 | 5/2012 | Sheffler |
| 2012/0117397 A1 | 5/2012 | Kolvick et al. |
| 2012/0124273 A1 | 5/2012 | Goss et al. |
| 2012/0131286 A1 | 5/2012 | Faith et al. |
| 2012/0151124 A1 | 6/2012 | Baek et al. |
| 2012/0151253 A1 | 6/2012 | Horn |
| 2012/0151294 A1 | 6/2012 | Yoo et al. |
| 2012/0173797 A1 | 7/2012 | Shen |
| 2012/0173826 A1 | 7/2012 | Takaku |
| 2012/0185750 A1 | 7/2012 | Hayami |
| 2012/0195126 A1 | 8/2012 | Roohparvar |
| 2012/0203804 A1 | 8/2012 | Burka et al. |
| 2012/0203951 A1 | 8/2012 | Wood et al. |
| 2012/0210095 A1 | 8/2012 | Nellans et al. |
| 2012/0216079 A1 | 8/2012 | Fai et al. |
| 2012/0233391 A1 | 9/2012 | Frost et al. |
| 2012/0236658 A1 | 9/2012 | Byom et al. |
| 2012/0239858 A1 | 9/2012 | Melik-Martirosian |
| 2012/0239868 A1 | 9/2012 | Ryan et al. |
| 2012/0239976 A1 | 9/2012 | Cometti et al. |
| 2012/0246204 A1 | 9/2012 | Nalla et al. |
| 2012/0259863 A1 | 10/2012 | Bodwin et al. |
| 2012/0275466 A1 | 11/2012 | Bhadra et al. |
| 2012/0278564 A1 | 11/2012 | Goss et al. |
| 2012/0284574 A1 | 11/2012 | Avila et al. |
| 2012/0284587 A1 | 11/2012 | Yu et al. |
| 2012/0297122 A1 | 11/2012 | Gorobets |
| 2013/0007073 A1 | 1/2013 | Varma |
| 2013/0007343 A1 | 1/2013 | Rub et al. |
| 2013/0007381 A1 | 1/2013 | Palmer |
| 2013/0007543 A1 | 1/2013 | Goss et al. |
| 2013/0024735 A1 | 1/2013 | Chung et al. |
| 2013/0031438 A1 | 1/2013 | Hu et al. |
| 2013/0036418 A1 | 2/2013 | Yadappanavar et al. |
| 2013/0038380 A1 | 2/2013 | Cordero et al. |
| 2013/0047045 A1 | 2/2013 | Hu et al. |
| 2013/0058145 A1 | 3/2013 | Yu et al. |
| 2013/0070527 A1 | 3/2013 | Sabbag et al. |
| 2013/0073784 A1 | 3/2013 | Ng et al. |
| 2013/0073798 A1 | 3/2013 | Kang et al. |
| 2013/0073924 A1 | 3/2013 | D'Abreu et al. |
| 2013/0079942 A1 | 3/2013 | Smola et al. |
| 2013/0086131 A1 | 4/2013 | Hunt et al. |
| 2013/0086132 A1 | 4/2013 | Hunt et al. |
| 2013/0094288 A1 | 4/2013 | Patapoutian et al. |

(56) References Cited

U.S. PATENT DOCUMENTS

| | | |
|---|---|---|
| 2013/0103978 A1 | 4/2013 | Akutsu |
| 2013/0110891 A1 | 5/2013 | Ogasawara et al. |
| 2013/0111279 A1 | 5/2013 | Jeon et al. |
| 2013/0111298 A1 | 5/2013 | Seroff et al. |
| 2013/0117606 A1 | 5/2013 | Anholt et al. |
| 2013/0121084 A1 | 5/2013 | Jeon et al. |
| 2013/0124792 A1 | 5/2013 | Melik-Martirosian et al. |
| 2013/0124888 A1 | 5/2013 | Tanaka et al. |
| 2013/0128666 A1 | 5/2013 | Avila et al. |
| 2013/0132647 A1 | 5/2013 | Melik-Martirosian |
| 2013/0132652 A1 | 5/2013 | Wood et al. |
| 2013/0159609 A1 | 6/2013 | Haas et al. |
| 2013/0176784 A1 | 7/2013 | Cometti et al. |
| 2013/0179646 A1 | 7/2013 | Okubo et al. |
| 2013/0191601 A1 | 7/2013 | Peterson et al. |
| 2013/0194865 A1 | 8/2013 | Bandic et al. |
| 2013/0194874 A1 | 8/2013 | Mu et al. |
| 2013/0232289 A1 | 9/2013 | Zhong et al. |
| 2013/0238576 A1 | 9/2013 | Binkert et al. |
| 2013/0254498 A1 | 9/2013 | Adachi et al. |
| 2013/0254507 A1 | 9/2013 | Islam et al. |
| 2013/0258738 A1 | 10/2013 | Barkon et al. |
| 2013/0265838 A1 | 10/2013 | Li |
| 2013/0282955 A1 | 10/2013 | Parker et al. |
| 2013/0290611 A1 | 10/2013 | Biederman et al. |
| 2013/0297613 A1 | 11/2013 | Yu |
| 2013/0301373 A1 | 11/2013 | Tam |
| 2013/0304980 A1 | 11/2013 | Nachimuthu et al. |
| 2013/0314988 A1 | 11/2013 | Desireddi et al. |
| 2013/0343131 A1 | 12/2013 | Wu et al. |
| 2013/0346672 A1 | 12/2013 | Sengupta et al. |
| 2014/0013027 A1 | 1/2014 | Jannyavula Venkata et al. |
| 2014/0013188 A1 | 1/2014 | Wu et al. |
| 2014/0025864 A1 | 1/2014 | Zhang et al. |
| 2014/0032890 A1 | 1/2014 | Lee et al. |
| 2014/0063905 A1 | 3/2014 | Ahn et al. |
| 2014/0067761 A1 | 3/2014 | Chakrabarti et al. |
| 2014/0071761 A1 | 3/2014 | Sharon et al. |
| 2014/0075133 A1 | 3/2014 | Li et al. |
| 2014/0082261 A1 | 3/2014 | Cohen et al. |
| 2014/0082310 A1 | 3/2014 | Nakajima |
| 2014/0082456 A1 | 3/2014 | Liu et al. |
| 2014/0082459 A1 | 3/2014 | Li et al. |
| 2014/0095775 A1 | 4/2014 | Talagala et al. |
| 2014/0101389 A1 | 4/2014 | Nellans et al. |
| 2014/0115238 A1 | 4/2014 | Xi et al. |
| 2014/0122818 A1 | 5/2014 | Hayasaka et al. |
| 2014/0122907 A1 | 5/2014 | Johnston |
| 2014/0136762 A1 | 5/2014 | Li et al. |
| 2014/0136883 A1 | 5/2014 | Cohen |
| 2014/0136927 A1 | 5/2014 | Li et al. |
| 2014/0143505 A1 | 5/2014 | Sim et al. |
| 2014/0153333 A1 | 6/2014 | Avila et al. |
| 2014/0157065 A1 | 6/2014 | Ong |
| 2014/0173224 A1 | 6/2014 | Fleischer et al. |
| 2014/0181458 A1 | 6/2014 | Loh et al. |
| 2014/0201596 A1 | 7/2014 | Baum et al. |
| 2014/0223084 A1 | 8/2014 | Lee et al. |
| 2014/0244578 A1 | 8/2014 | Winkelstraeter |
| 2014/0258755 A1 | 9/2014 | Stenfort |
| 2014/0269090 A1 | 9/2014 | Flynn et al. |
| 2014/0310494 A1 | 10/2014 | Higgins et al. |
| 2014/0359044 A1 | 12/2014 | Davis et al. |
| 2014/0359381 A1 | 12/2014 | Takeuchi et al. |
| 2015/0023097 A1 | 1/2015 | Khoueir et al. |
| 2015/0032967 A1 | 1/2015 | Udayashankar et al. |
| 2015/0037624 A1 | 2/2015 | Thompson et al. |
| 2015/0153799 A1 | 6/2015 | Lucas et al. |
| 2015/0153802 A1 | 6/2015 | Lucas et al. |
| 2015/0212943 A1 | 7/2015 | Yang et al. |
| 2015/0268879 A1 | 9/2015 | Chu |
| 2015/0286438 A1 | 10/2015 | Simionescu et al. |

FOREIGN PATENT DOCUMENTS

| | | |
|---|---|---|
| EP | 1 990 921 A2 | 11/2008 |
| EP | 2 386 958 A1 | 11/2011 |
| EP | 2 620 946 A2 | 7/2013 |
| JP | 2002-532806 | 10/2002 |
| WO | WO 2007/036834 | 4/2007 |
| WO | WO 2007/080586 | 7/2007 |
| WO | WO 2008/075292 A2 | 6/2008 |
| WO | WO 2008/121553 | 10/2008 |
| WO | WO 2008/121577 | 10/2008 |
| WO | WO 2009/028281 | 3/2009 |
| WO | WO 2009/032945 | 3/2009 |
| WO | WO 2009/058140 | 5/2009 |
| WO | WO 2009/084724 | 7/2009 |
| WO | WO 2009/134576 | 11/2009 |
| WO | WO 2011/024015 | 3/2011 |

OTHER PUBLICATIONS

International Search Report and Written Opinion dated Jul. 25, 2014, received in International Patent Application No. PCT/US2014/029453, which corresponds to U.S. Appl. No. 13/963,444, 9 pages (Frayer).

IBM Research-Zurich, "The Fundamental Limit of Flash Random Write Performance: Understanding, Analysis and Performance Modeling," Mar. 31, 2010, pp. 1-15.

Ashkenazi et al., "Platform independent overall security architecture in multi-processor system-on-chip integrated circuits for use in mobile phones and handheld devices." ScienceDirect, Computers and Electrical Engineering 33 (2007), 18 pages.

Invitation to Pay Additional Fees dated Feb. 13, 2015, received in International Patent Application No. PCT/US2014/063949, which corresponds to U.S. Appl. No. 14/135,433, 6 pages (Delpapa).

International Search Report and Written Opinion dated Mar. 9, 2015, received in International Patent Application No. PCT/US2014/059747, which corresponds to U.S. Appl. No. 14/137,440, 9 pages (Fitzpatrick).

International Search Report and Written Opinion dated Jan. 21, 2015, received in International Application No. PCT/US2014/059748, which corresponds to U.S. Appl. No. 14/137,511, 13 pages (Dancho).

International Search Report and Written Opinion dated Feb. 18, 2015, received in International Application No. PCT/US2014/066921, which corresponds to U.S. Appl. No. 14/135,260, 13 pages (Fitzpatrick).

Bayer, "Prefix B-Trees", ip.com Journal ip.com Inc., West Henrietta, NY, Mar. 30, 2007, 29 pages.

Bhattacharjee et al., "Efficient Index Compression in DB2 LUW", IBM Research Report, Jun. 23, 2009, http://domino.research.ibm.com/library/cyberdig.nsf/papers/40B2C45876D0D747852575E100620CE7/$File/rc24815.pdf, 13 pages.

Lee et al., "A Semi-Preemptive Garbage Collector for Solid State Drives," Apr. 2011, IEEE, pp. 12-21.

Oracle, "Oracle9i: Database Concepts", Jul. 2001, http://docs.oracle.com/cd/A91202_01/901_doc/server.901/a88856.pdf, 49 pages.

Office Action dated Feb. 17, 2015, received in Chinese Patent Application No. 201210334987.1, which corresponds to U.S. Appl. No. 12/082,207, 9 pages (Prins).

International Search Report and Written Opinion dated May 4, 2015, received in International Patent Application No. PCT/US2014/065987, which corresponds to U.S. Appl. No. 14/135,400, 12 pages (George).

International Search Report and Written Opinion dated Mar. 17, 2015, received in International Patent Application No. PCT/US2014/067467, which corresponds to U.S. Appl. No. 14/135,420, 13 pages (Lucas).

International Search Report and Written Opinion dated Apr. 20, 2015, received in International Patent Application No. PCT/US2014/063949, which corresponds to U.S. Appl. No. 14/135,433, 21 pages (Delpapa).

(56) References Cited

OTHER PUBLICATIONS

International Search Report and Written Opinion dated Jun. 8, 2015, received in International Patent Application No. PCT/US2015/018252, which corresponds to U.S. Appl. No. 14/339,072, 9 pages (Busch).
International Search Report and Written Opinion dated Jun. 2, 2015, received in International Patent Application No. PCT/US2015/018255, which corresponds to U.S. Appl. No. 14/336,967, 14 pages (Chander).
Gasior, "Gigabyte's i-Ram storage device, Ram disk without the fuss," The Tech Report, p. 1, Jan. 25, 2006, 5 pages.
Oestreicher et al., "Object Lifetimes in Java Card," 1999, USENIX, 10 pages.
International Preliminary Report on Patentability dated May 24, 2016, received in International Patent Application No. PCT/US2014/065987, which corresponds to U.S. Appl. No. 14/135,400, 9 pages (George).
Barr, "Introduction to Watchdog Timers," Oct. 2001, 3 pgs.
Canim, "Buffered Bloom Filters on Solid State Storage," ADMS*10, Singapore, Sep. 13-17, 2010, 8 pgs.
Kang, "A Multi-Channel Architecture for High-Performance NAND Flash-Based Storage System," J. Syst. Archit., vol. 53, Issue 9, Sep. 2007, 15 pgs.
Kim, "A Space-Efficient Flash Translation Layer for CompactFlash Systems," May 2002, IEEE vol. 48, No. 2, 10 pgs.
Lu, "A Forest-structured Bloom Filter with Flash Memory," MSST 2011, Denver, CO, May 23-27, 2011, article, 6 pgs.
Lu, "A Forest-structured Bloom Filter with Flash Memory," MSST 2011, Denver, CO, May 23-27, 2011, presentation slides, 25 pgs.
McLean, "Information Technology—AT Attachment with Packet Interface Extension," Aug. 19, 1998, 339 pgs.
Microchip Technology, "Section 10. Watchdog Timer and Power-Saving Modes," 2005, 14 pages.
Park et al., "A High Perfomance Controller for NAND Flash-Based Solid State Disk (NSSD)," Proceedings of Non-Volatile Semiconductor Memory Workshop, Feb. 2006, 4 pgs.
Zeidman, 1999 Verilog Designer's Library, 9 pgs.
International Search Report and Written Opinion dated Jun. 6, 2013, received in International Patent Application No. PCT/US2012/059447, which corresponds to U.S. Appl. No. 13/602,031, 12 pgs (Tai).
International Search Report and Written Opinion dated May 23, 2013, received in International Patent Application No. PCT/US2012/065914, which corresponds to U.S. Appl. No. 13/679,963, 7 pgs (Frayer).
International Search Report and Written Opinion, dated Mar. 19, 2009 received in International Patent Application No. PCT/US08/88133, which corresponds to U.S. Appl. No. 12/082,202, 7 pgs (Prins).
International Search Report and Written Opinion dated Feb. 19, 2009, received in International Patent Application No. PCT/US08/88236, which corresponds to U.S. Appl. No. 12/082,203, 7 pgs (Olbrich).
International Search Report and Written Opinion dated Feb. 19, 2009, received in International Patent Application No. PCT/US08/88217, which corresponds to U.S. Appl. No. 12/082,204, 7 pgs (Olbrich).
International Search Report and Written Opinion dated Mar. 19, 2009, received in International Patent Application No. PCT/US08/88136, which corresponds to U.S. Appl. No. 12/082,205, 7 pgs (Olbrich).
International Search Report and Written Opinion dated Feb. 18, 2009, received in International Patent Application No. PCT/US08/88206, which corresponds to U.S. Appl. No. 12/082,206, 7 pgs (Prins).
International Search Report and Written Opinion dated Feb. 27, 2009, received in International Patent Application No. PCT/US2008/088154, which corresponds to U.S. Appl. No. 12/082,207, 8 pgs (Prins).
European Search Report dated Feb. 23, 2012, received in European Patent Application No. 08866997.3, which corresponds to U.S. Appl. No. 12/082,207, 6 pgs (Prins).
Office Action dated Apr. 18, 2012, received in Chinese Patent Application No. 200880127623.8, which corresponds to U.S. Appl. No. 12/082,207, 12 pgs (Prins).
Office Action dated Dec. 31, 2012, received in Chinese Patent Application No. 200880127623.8, which corresponds to U.S. Appl. No. 12/082,207, 9 pgs (Prins).
Notification of the Decision to Grant a Patent Right for Patent for Invention dated Jul. 4, 2013, received in Chinese Patent Application No. 200880127623.8, which corresponds to U.S. Appl. No. 12/082,207, 1 pg (Prins).
Office Action dated Jul. 24, 2012, received in Japanese Patent Application No. JP 2010-540863, 3 pgs (Prins).
International Search Report and Written Opinion dated Feb. 13, 2009, received in International Patent Application No. PCT/US08/88164, which corresponds to U.S. Appl. No. 12/082,220, 6 pgs (Olbrich).
International Search Report and Written Opinion dated Feb. 26, 2009, received in International Patent Application No. PCT/US08/88146, which corresponds to U.S. Appl. No. 12/082,221, 10 pgs (Olbrich).
International Search Report and Written Opinion dated Feb. 19, 2009, received in International Patent Application No. PCT/US08/88232, which corresponds to U.S. Appl. No. 12/082,222, 8 pgs (Olbrich).
International Search Report and Written Opinion dated Feb. 13, 2009, received in International Patent Application No. PCT/US08/88229, which corresponds to U.S. Appl. No. 12/082,223, 7 pgs (Olbrich).
International Search Report and Written Opinion dated Oct. 27, 2009, received in International Patent Application No. PCT/US2011/028637, which corresponds to U.S. Appl. No. 12/726,200, 13 pgs (Olbrich).
International Search Report and Written Opinion dated Aug. 31, 2012, received in International Patent Application No. PCT/US2012/042764, which corresponds to U.S. Appl. No. 13/285,873, 12 pgs (Frayer).
International Search Report and Written Opinion dated Mar. 4, 2013, received in PCT/US2012/042771, which corresponds to U.S. Appl. No. 13/286,012, 14 pgs (Stonelake).
International Search Report and Written Opinion dated Sep. 26, 2012, received in International Patent Application No. PCT/US2012/042775, which corresponds to U.S. Appl. No. 13/285,892, 8 pgs (Weston-Lewis et al.).
International Search Report and Written Opinion dated Jun. 6, 2013, received in International Patent Application No. PCT/US2012/059453, which corresponds to U.S. Appl. No. 13/602,039, 12 pgs (Frayer).
International Search Report and Written Opinion dated Feb. 14, 2013, received in International Patent Application No. PCT/US2012/059459, which corresponds to U.S. Appl. No. 13/602,047, 9 pgs (Tai).
International Search Report and Written Opinion dated Mar. 7, 2014, received in International Patent Application No. PCT/US2013/074772, which corresponds to U.S. Appl. No. 13/831,218, 10 pgs (George).
International Search Report and Written Opinion dated Mar. 24, 2014, received in International Patent Application No. PCT/US2013/074777, which corresponds to U.S. Appl. No. 13/831,308, 10 pgs (George).
International Search Report and Written Opinion dated Mar. 7, 2014, received in International Patent Application No. PCT/US2013/074779, which corresponds to U.S. Appl. No. 13/831,374, 8 pgs (George).
International Search Report and Written Opinion dated Apr. 5, 2013, received in International Patent Application No. PCT/US2012/

(56) References Cited

OTHER PUBLICATIONS 065916, which corresponds to U.S. Appl. No. 13/679,969, 7 pgs (Frayer).

International Search Report and Written Opinion dated Jun. 17, 2013, received in International Patent Application No. PCT/US2012/065919, which corresponds to U.S. Appl. No. 13/679,970, 8 pgs (Frayer).

International Search Report and Written Opinion dated Jun. 30, 2015, received in International Patent Application No. PCT/US2015/023927, which corresponds to U.S. Appl. No. 14/454,687, 11 pages (Kadayam).

International Search Report and Written Opinion dated Jul. 23, 2015, received in International Patent Application No. PCT/US2015/030850, which corresponds to U.S. Appl. No. 14/298,843, 12 pages (Ellis).

Office Action dated Dec. 8, 2014, received in Chinese Patent Application No. 201180021660.2, which corresponds to U.S. Appl. No. 12/726,200, 7 pages (Olbrich).

Office Action dated Jul. 31, 2015, received in Chinese Patent Application No. 201180021660.2, which corresponds to U.S. Appl. No. 12/726,200, 9 pages (Olbrich).

International Search Report and Written Opinion dated Sep. 14, 2015, received in International Patent Application No. PCT/US2015/036807, which corresponds to U.S. Appl. No. 14/311,152, 9 pages (Higgins).

Office Action dated Apr. 25, 2016, received in Chinese Patent Application No. 201280066282.4, which corresponds to U.S. Appl. No. 13/602,047, 8 pages (Tai).

International Preliminary Report on Patentability dated Dec. 20, 2016, received in International Patent Application No. PCT/US2015/036807, which corresponds to U.S. Appl. No. 14/311,152, 6 pages (Higgins).

International Preliminary Report on Patentability dated Dec. 6, 2016, received in International Patent Application No. PCT/US2015/030850, which corresponds to U.S. Appl. No. 14/298,843, 8 pages (Ellis).

\* cited by examiner

CONDITIONAL UPDATES FOR REDUCING FREQUENCY OF DATA MODIFICATION OPERATIONS

RELATED APPLICATIONS

This application claims priority to U.S. Provisional Application Ser. No. 61/973,174, filed Mar. 31, 2014, which is incorporated by reference herein in its entirety.

This application is also related to U.S. Provisional Patent Application No. 61/973,170, filed Mar. 31, 2014, U.S. Provisional Patent Application No. 61/973,177, filed Mar. 31, 2014, U.S. patent application Ser. No. 14/336,931, filed Jul. 21, 2014, and U.S. patent application Ser. No. 14/336,967, filed Jul. 21, 2014, all of which are hereby incorporated by reference in their entireties.

TECHNICAL FIELD

The disclosed embodiments relate generally to memory systems, and in particular, to improving the performance and efficiency of tiered data structures.

BACKGROUND

The speed of many computer operations is frequently constrained by the speed and efficiency with which data can be stored and retrieved from data structures associated with the device. Many conventional data structures take a long time to store and retrieve data. However, tiered data structures can be used to dramatically improve the speed and efficiency of data storage. Some tiered data structures enable data searches, data insertions, data deletions and sequential data access to be performed in logarithmic time. However, further improvements to tiered data structures can further increase the speed and efficiency with which data can be stored and retrieved, thereby improving the performance of computers relying on such tiered data structures.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to improve the performance and efficiency of tiered data structures.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
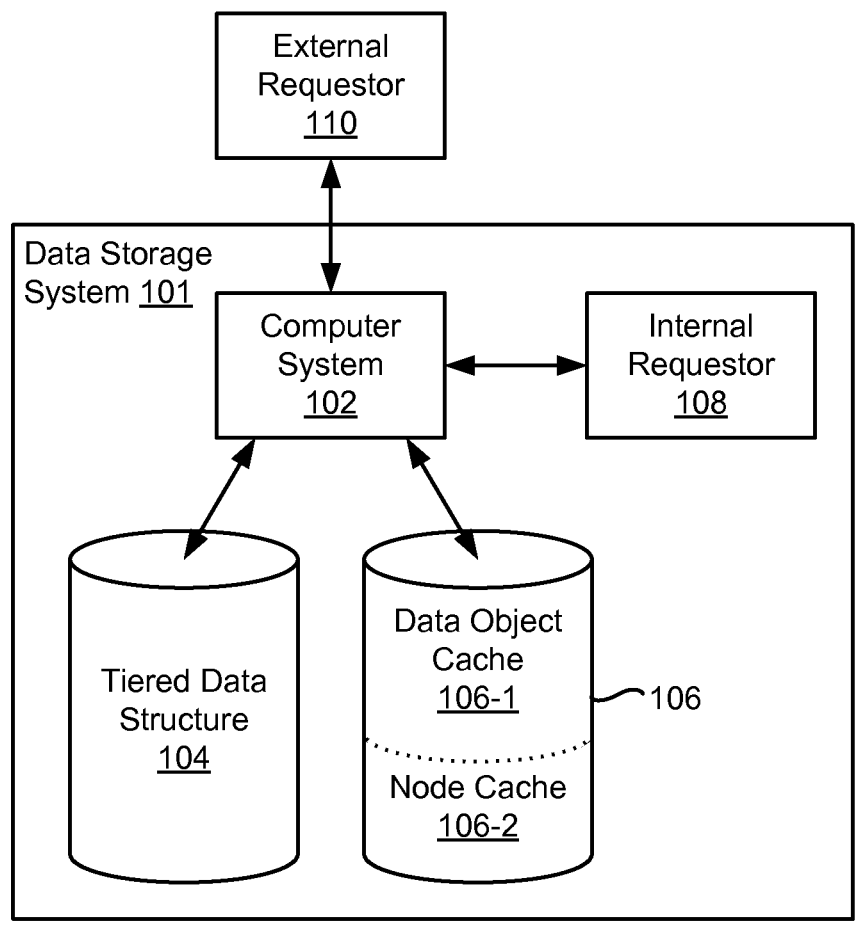
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to improve the performance and efficiency of tiered data structures. One or more of the various implementations described herein include systems, methods and/or devices for efficient cache utilization in a tiered data structure. One or more of the various implementations described herein include systems, methods and/or devices for performing conditional updates for reducing frequency of data modification operations (e.g., in a tiered data structure). One or more of the various implementations described herein include systems, methods and/or devices for compaction of information in a tiered data structure.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

As described in more detail below, a computer system detects a request, from a requestor, to access a first data object stored in a tiered data structure that includes internal nodes and leaf nodes. In response to detecting the request to access the first data object, the computer system retrieves a leaf node that includes the first data object and locks the leaf node that includes the first data object. While the leaf node that includes the first data object is locked, the computer system transmits, to the requestor, a first conditional-update communication and detecting a first conditional-update response in response to the first conditional-update communication. In response to detecting the first conditional-update response corresponding to the first data object, the computer system performs one or more operations based on the first conditional-update response corresponding to the first data object before unlocking the leaf node that includes the first data object.

In some embodiments, two or more of the leaf nodes each include multiple data objects, each of the data objects including unique key information and a corresponding value.

In some embodiments, the request to access a first data object includes a conditional request to modify the first data object.

In some embodiments, the leaf node that includes the first data object is write-locked while the first conditional-update communication is transmitted and the response is received.

In some embodiments, retrieving the leaf node includes traversing the tiered data structure by navigating through one or more internal nodes to the leaf node that includes the first data object, and after traversing through the one or more internal nodes, the computer system read-locks the one or more internal nodes that were traversed to reach the leaf node that includes the first data object.

In some embodiments, the first conditional-update communication provides information that enables the requestor to determine whether or not to update the value of the first data object based on a current value of the first data object. In some of these embodiments, performing the one or more operations based on the first conditional-update response includes, in accordance with a determination that the first conditional-update response includes a request to update the value of the first data object, updating the value of the first data object in accordance with the first conditional-update response; and in accordance with a determination that the first conditional-update response does not include a request to update the value of the first data object, forgoing updating the value of the first data object.

In some embodiments, the request to access the first data object identifies a plurality of data objects including the first data object. In some of these embodiments, while the leaf node that includes the first data object is locked, and after performing the one or more operations based on the first conditional-update response corresponding to the first data object, the computer system: transmits to the requestor a second conditional-update communication that includes an indication of the current value of a second data object in the plurality of data objects; detects a second conditional-update response corresponding to the second data object received from the requestor in response to the second conditional-update communication; and in response to detecting the second conditional-update response corresponding to the second data object, performs one or more operations based on the second conditional-update response corresponding to the second data object. Furthermore, the leaf node that includes the first data object is unlocked after the computer system performs the one or more operations based on the second conditional-update response corresponding to the second data object.

In some embodiments, the conditional-update communication includes an executable callback object, and the conditional-update response corresponds to a result generated based on execution of the callback object.

In some embodiments, the one or more memory devices include one or more three-dimensional (3D) memory devices and circuitry associated with operation of memory elements in the one or more 3D memory devices. Furthermore, in some embodiments, the circuitry and one or more memory elements in a respective 3D memory device, of the one or more 3D memory devices, are on the same substrate (e.g., a silicon substrate).

FIG. 1 is a block diagram illustrating an implementation of a data storage system 101, in accordance with some embodiments. While some example features are illustrated, various other features have not been illustrated for the sake of brevity and so as not to obscure more pertinent aspects of the example implementations disclosed herein. To that end, as a non-limiting example, data storage system 101 includes computer system 102, tiered data structure 104, cache 106, and one or more internal requestors 108 (e.g., processes or applications that are internal to data storage system 101). While internal requestor 108 is shown as separate from computer system 102 in FIG. 1, in some circumstances internal requestor 108 is a processor application that is co-resident with data access processes on the computer system 102. In some embodiments, cache 106 is divided into a data object cache portion 106-1 for storing data objects retrieved from tiered data structure 104 and node cache portion 106-2 for storing nodes retrieved from tiered data structure 104. In some embodiments, there is a separate data object cache 106-1 that is distinct from node cache 106-2. While cache 106 is shown as separate from computer system 102 in FIG. 1, in some circumstances cache 106 is stored in memory of computer system 102.

In some embodiments, tiered data structure 104 is stored in non-volatile memory such as NAND-type flash memory or NOR-type flash memory, magnetic hard disk drives or other persistent storage medium that maintains its state when power is removed. In some embodiments, cache 106 is stored in RAM or other random access memory that is not persistent and does not maintain its state when power is removed. In some embodiments, tiered data structure 104 is divided across a plurality of storage devices. Computer system 102 responds to requests from internal requestors 108 (e.g., other computer systems or components of data storage system 101 that need access to data stored in tiered data structure 104) and/or external requestors 110 by storing, retrieving, and modifying data in tiered data structure 104 and cache 106, as described in greater detail below with reference to FIGS. 4A-4E, 5A-5C, and 6A-6D FIG. 2 is a block diagram illustrating an implementation of a computer system 102, in accordance with some embodiments. Computer system 102 typically includes one or more processors (also sometimes called CPUs or processing units or microprocessors or microcontrollers) 202 for executing modules, programs and/or instructions stored in memory 206 and thereby performing processing operations, memory 206, and one or more communication buses 208 for interconnecting these components. Communication buses 208 optionally include circuitry (sometimes called a chipset) that interconnects and controls communications between system components. In some embodiments, computer system 102 is coupled to tiered data structure 104, and cache 106 (optionally including data object cache portion 106-1 and node cache portion 106-2) by communication buses 208 and storage interface(s) 210 (e.g., an input output, I/O, interface such as a PCI bus or PCIe bus). In some embodiments, computer system 102 is coupled to internal requestor(s) 108 and/or external requestors 110 by communication buses 208 and requestor interface(s) 212. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processor(s) 202. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset thereof:

operating logic 220 includes procedures for handling various basic system services and for performing hardware dependent tasks;

communications module 222 that is used for communicating with other computer systems or computer components (e.g., via storage interface(s) 210 and requestor interface(s) 212);

request module 224 for detecting and processing request received from internal requestors 108 (FIG. 1) and external requestors 110 (FIG. 1);

cache module 226 for storing and retrieving information (e.g., data objects and nodes) from cache 106, optionally including:

cache storage module 228 for storing information (e.g., data objects and nodes) in cache 106;

cache search module 230 for performing searches based on requested information (e.g., a search for a requested data object or retrieving a node for use in searching for a requested data object) in cache 106; and cache eviction policies 232 for determining which information (e.g., data objects and/or nodes) to evict from cache 106;

tiered data structure module 234 for storing and retrieving information (e.g., data objects and nodes) within tiered data structure 104, optionally including:

tiered data structure storage module 236 for storing information (e.g., new data objects or updated data objects) in leaf nodes of tiered data structure 104 and/or deleting information from tiered data structure 104;

tiered data structure search module 238 for searching through tiered data structure 104 for requested data (e.g., one or more data objects requested by a requestor);

metadata generator 240 for generating metadata for data objects that is stored in leaf nodes of tiered data structure 104 with the data objects and enables the data objects to be located with tiered data structure search module 238 in response to requests from requestors; and conditional update module 242 for locking portions of tiered data structure 104 while a conditional update operation is being performed so as to improve the efficiency of the conditional update operation;

response generator 224 for generating responses to requests from internal and external requestors based on data retrieved in response to the requests; and optionally, one or more internal requestors 108 for requesting data objects from tiered data structure 104 and/or cache 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing respective operations in the methods described below with reference to FIGS. 4A-4E, 5A-5C, and/or 6A-6D.

Figure 2:
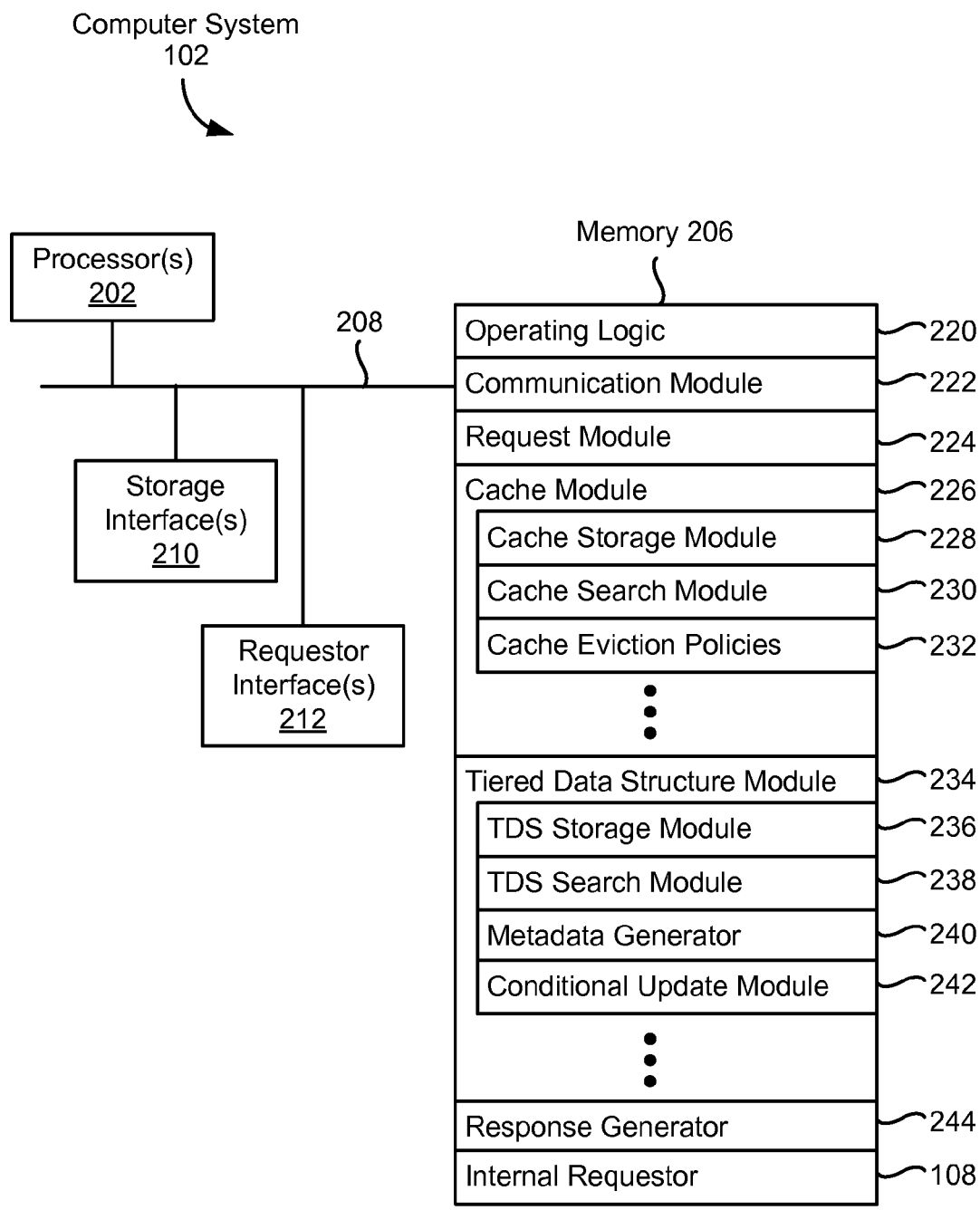
FIG. 2 is a block diagram illustrating an implementation of a computer system, in accordance with some embodiments.

Although FIG. 2 shows a computer system 102, FIG. 2 is intended more as a functional description of the various features which may be present in a non-volatile computer system than as a structural schematic of the embodiments described herein. In practice, and as recognized by those of ordinary skill in the art, items shown separately could be combined and some items could be separated.

Figure 3A:
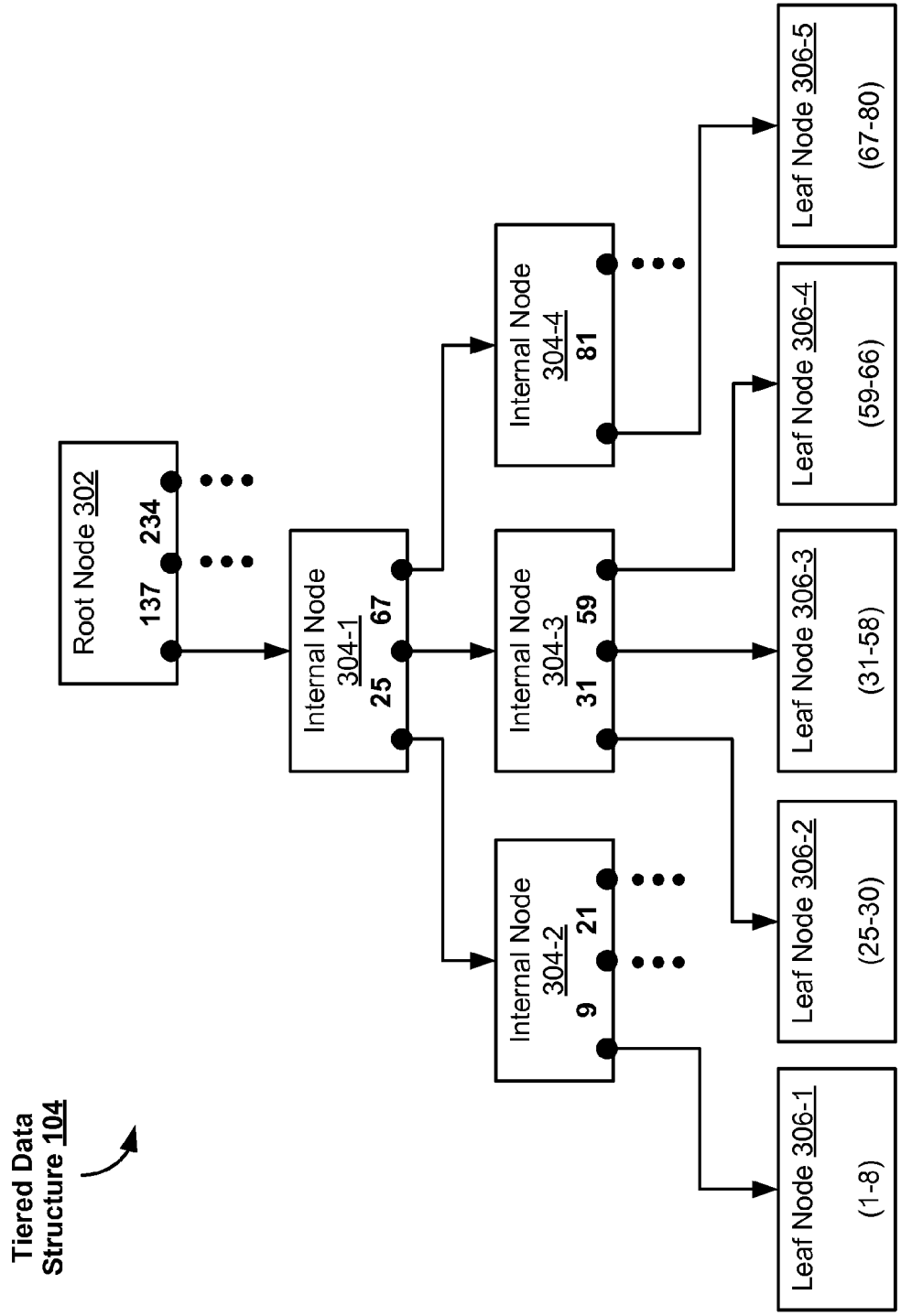
FIGS. 3A-3F illustrate an example of a tiered data structure and example operations performed with the example tiered data structure, in accordance with some embodiments.

FIG. 3A illustrates an example of a tiered data structure, in accordance with some embodiments. Tiered data structure 104 includes a plurality of nodes. The plurality of nodes are organized in a tiered structure in which each respective node is connected to one or more other nodes in levels (tiers) above and/or below the respective node. A parent node for a respective node in tiered data structure 104 is a node that is a level (tier) above the respective node in tiered data structure 104 and refers to the respective node. A child node for a respective node in tiered data structure 104 is a node that is a level (tier) below the respective node in tiered data structure 104 and refers to the respective node. Two nodes are at the same level if they have a same number of nodes to traverse to reach root node 302. Root node 302 is an external node that has no parent node, typically there is only one root node for tiered data structure 104. Internal nodes 304 are nodes that have both a parent node and one or more child nodes and are thus internal to the tiered data structure. Leaf nodes 306 are nodes that do not have child nodes and are thus "external" nodes. Root node 302 and internal nodes 304 include references that indicate which child nodes are associated with a particular range of data. For example, root node 302 in FIG. 3A indicates that internal node 304-1 is associated with data with keys between 1 and 136. Internal node 304-1 indicates that: internal node 304-2 is associated with data objects having keys between 1 and 24; internal node 304-3 is associated with data objects having keys between 25 and 66; and internal node 304-4 is associated with data objects having keys between 67 and 136. Similarly, internal node 304-3 indicates that: leaf node 306-2 includes data with keys between 25 and 30; leaf node 306-3 includes data with keys between 31 and 58; and leaf node 306-4 includes data with keys between 59 and 66, and so on.

Navigating the tiered data structure typically, but optionally, relies on the assumption that keys are always sorted in a predefined order (e.g., monotonically ascending), so that a node that is associated with data having keys between a first value and a second value is associated with all data in the tiered data structure that has keys between the first value and the second value. In some embodiments, each leaf node has a maximum size and when the leaf node exceeds the maximum size, the leaf node is split into two leaf nodes. In some embodiments, each leaf node has a minimum size and when a leaf node is below the minimum size, the leaf node is combined with one or more other leaf nodes. In some embodiments, each non-leaf node (e.g., root node or internal node) has a maximum number of child nodes, and when a splitting a leaf node results in a non-leaf node having more than the maximum number of child nodes, the non-leaf node is split to accommodate the extra child nodes. In some embodiments, each non-leaf node (e.g., root node or internal node) has a minimum number of child nodes, and when a combining two or more leaf nodes results in a non-leaf node having less than the minimum number of child nodes, the non-leaf node is combined with one or more other non-leaf nodes to accommodate the reduced number of child nodes. The tiered data structure may additionally conform to some or all of the rules associated with B−Trees, B+Trees, B*Trees or other tiered data structures.

Figure 3B:
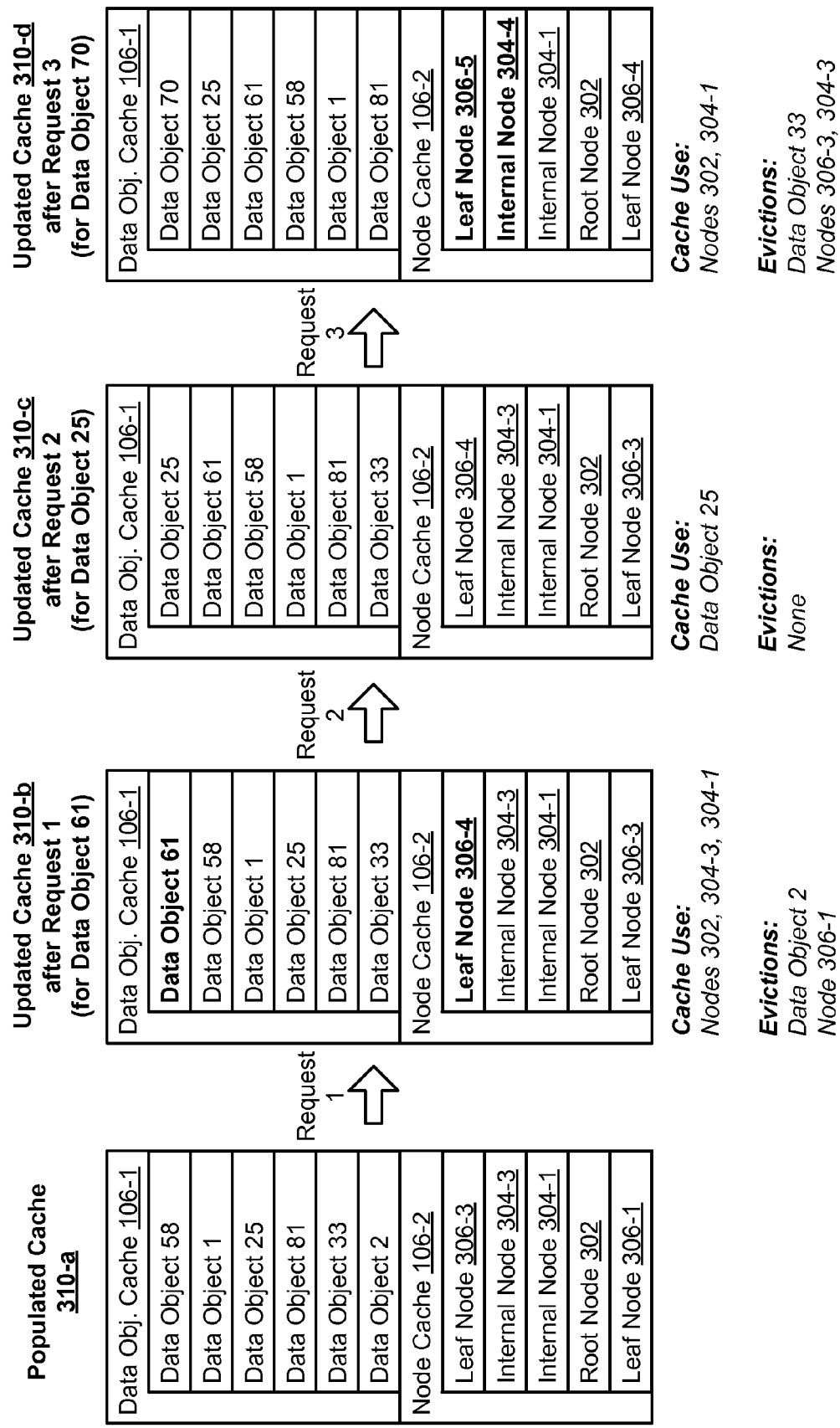

FIG. 3B illustrates an example of efficient cache utilization in a tiered data structure, in accordance with some embodiments. In FIG. 3B, populated cache 310-*a* is an example of cache 106 from FIGS. 1 and 2 that is populated with one or more data objects and one or more nodes that were retrieved to respond to prior requests for data objects by one or more internal or external requestors. For example, one of the prior requests was a request for data object 58, so computer system 102 traversed through tiered data structure 104 in FIG. 3A by traversing, in sequence, root node 302, internal node 304-1, internal node 304-3 to identify and retrieve leaf node 306-3, which includes data object 58. After retrieving data object 58, data object 58 is cached in data object cache portion 106-1 and the traversed nodes are cached in node cache portion 106-2. In FIG. 3B, the data objects in the populated cache 310 are shown in order of "staleness" where more stale data objects are near the bottom of data object cache portion 106-1 and less stale (e.g., fresher) data objects are near the top of data object cache portion 106-1, as data objects are refreshed, they are reordered in the cache to represent their staleness, even though the data objects are, in many circumstances, not actually moved within the cache. Similarly, in FIG. 3B, the nodes in the populated cache 310 are shown in order of "staleness" where more stale nodes are near the bottom of node cache portion 106-2 and less stale (e.g., fresher) data objects are near the top of node cache portion 106-2, as nodes are refreshed, they are reordered in the cache to represent their staleness, even though nodes are, in many circumstances, not actually moved within the cache.

In FIG. 3B, in response to a request (e.g., "request 1") for data object 61, computer system 102 determines that data object 61 is not in data object cache portion 106-1 in populated cache 310-*a*. Subsequently, computer system 102 traverses through tiered data structure 104 in FIG. 3A by traversing, in sequence, root node 302, internal node 304-1, internal node 304-3 to identify and retrieve leaf node 306-4, which includes data object 61. When traversing tiered data structure 104, computer system 102 is able to use a number of cached nodes to improve response time (e.g., by using root node 302, internal node 304-1 and internal node 304-3 to determine that leaf node 306-4 has been retrieved from tiered data structure 104). Computer system 102 caches the traversed nodes in node cache portion 106-2 and caches data object 61 in data object cache portion 106-1 as shown in updated cache 310-*b* in FIG. 3B. In order to make room for the traversed nodes and retrieved data object, data object 2 and leaf node 306-1 are evicted from cache 106 in accordance with a cache eviction policy, as shown in updated cache 310-*b* in FIG. 3B.

In FIG. 3B, in response to a request (e.g., "request 2") for data object 25, computer system 102 determines that data object 25 is in data object cache portion 106-1 in populated cache 310-*b*. As data object 25 is already in data object cache portion 106-1, computer system 102 does not traverse tiered data structure 104 to retrieve data object 25, because data object 25 is retrieved from cache 106. In conjunction with being retrieved, data object 25 is refreshed in data object cache portion 106-1 so that it is less stale than object 61 rather than being more stale than data object 61, as shown in updated cache 310-*c* in FIG. 3B. In some embodiments, data object 25 is identified in data object cache portion 106-1 using a hash table to locate a portion of data object cache portion 106-1 that includes data object 25. As no new data objects or nodes were added to cache 106, no data objects or nodes are evicted from cache 106.

In FIG. 3B, in response to a request (e.g., "request 3") for data object 70, computer system 102 determines that data object 70 is not in data object cache portion 106-1 in populated cache 310-*c*. Subsequently, computer system 102 traverses through tiered data structure 104 in FIG. 3A by traversing, in sequence, root node 302, internal node 304-1, internal node 304-4 to identify and retrieve leaf node 306-5, which includes data object 70. When traversing tiered data structure 104, computer system 102 is able to use a number of cached nodes to improve response time (e.g., by using root node 302 and internal node 304-1 to determine that internal node 304-4 and leaf node 306-5 have to be retrieved from tiered data structure 104). Computer system 102 caches the traversed nodes in node cache portion 106-2 and caches data object 70 in data object cache portion 106-1 as shown in updated cache 310-*d* in FIG. 3B. In order to make room for the traversed nodes and retrieved data object, data object 33, internal node 304-3, and leaf node 306-3 are evicted from cache 106 in accordance with a cache eviction policy, as shown in updated cache 310-*d* in FIG. 3B.

While the preceding examples have been shown with a small number of data objects and nodes, it should be understood that in a typical cache, a much larger number of data objects and nodes are stored in the cache and similar processes are performed. For example in an 2 GB (gigabyte) DRAM cache with a 1 GB data object cache portion, a 1 gigabyte node cache portion, an average node size of 8 KB (kilobytes) and an average data object size of 1 KB, the data object cache portion would hold approximately 1 million data objects and the node cache portion would hold approximately 250,000 nodes. In some embodiments, only internal nodes 304 are cached in node cache portion 106-2. In some embodiments, root node 302 and leaf nodes 306 are cached in node cache portion 106-2, but most leaf nodes are quickly evicted from node cache portion 106-2, while internal nodes 304 are frequently used and are thus frequently refreshed in cache 106, so that the node cache portion 106-2 includes primarily internal nodes 304 during normal operation (e.g., 50% or more of the capacity of node cache portion 106-2 is occupied by internal nodes). Using a data object cache in addition to a node cache instead of solely using a node cache improves the performance of the cache by increasing the likelihood that a requested data object will be available from the cache. For example, using a 1 GB data object cache in addition to a 1 GB node cache approximately quadruples the object capacity of the cache as compared with a 2 GB node cache. Additional details regarding efficient cache utilization in a tiered data structure are described below with reference to method 400 and FIGS. 4A-4E.

Figure 3C:
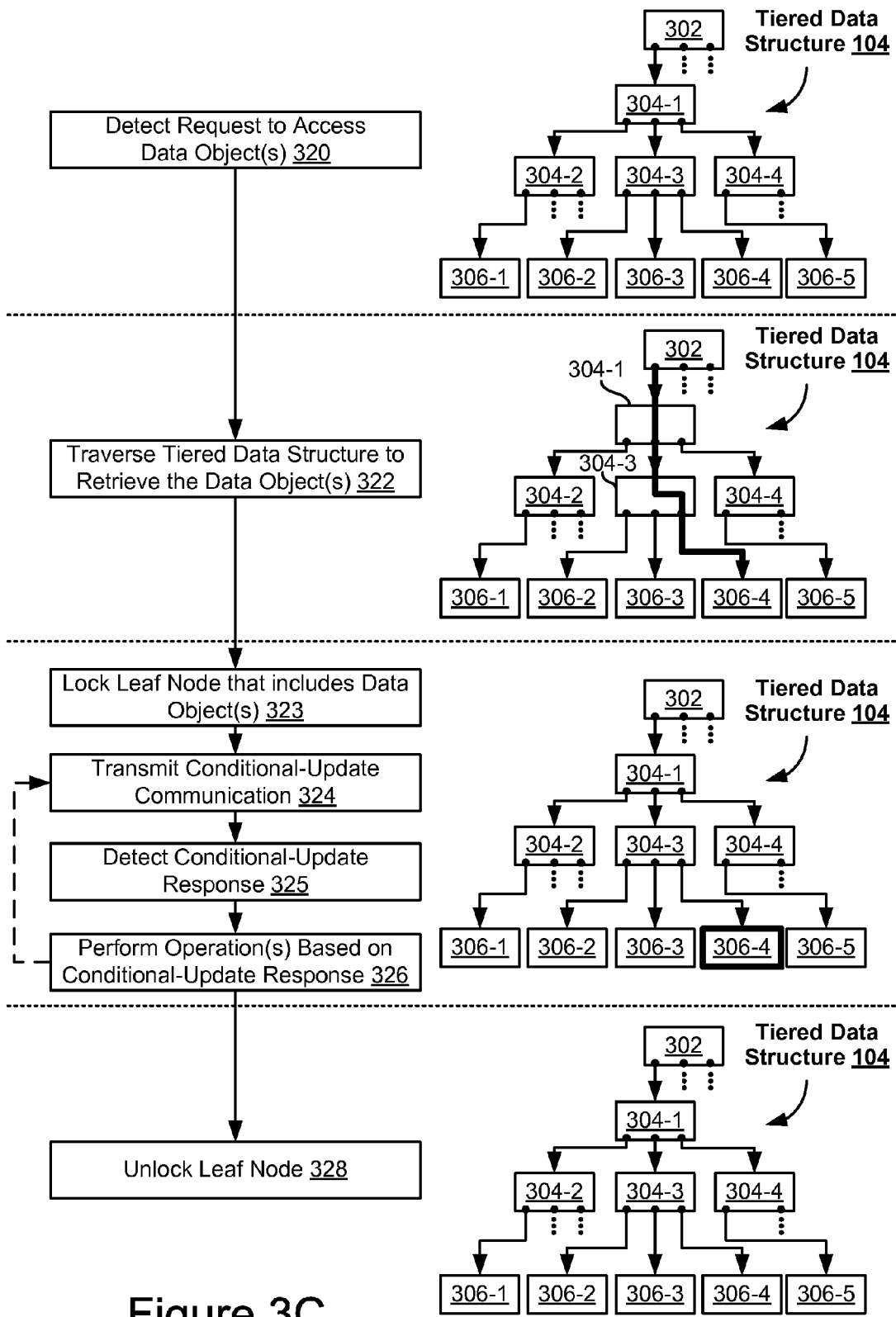

FIG. 3C illustrates an example of performing conditional updates for reducing frequency of traversals (e.g., in a tiered data structure), in accordance with some embodiments. In FIG. 3C, computer system 102 (FIGS. 1 and 2) detects (320) a request, received from an internal requestor or an external requestor, to access one or more data objects (e.g., data object 59, which is in leaf node 306-4). In some circumstances, when the request is detected, tiered data structure 104 does not have any nodes locked (e.g., read locked or read/write locked) by computer system 102. Although, in some circumstances one or more other computer systems using the same tiered data structure optionally lock one or more of the nodes of tiered data structure 104 when they are using those nodes. Assuming that the requested data object(s) are not available in a cache (e.g., as described above with reference to FIG. 3B), computer system 102 traverses (322) tiered data structure 104, as shown in FIG. 3C, to reach the node (e.g., leaf node 306-4) that includes the requested data object(s) (e.g., data object 59).

Figure 5A:
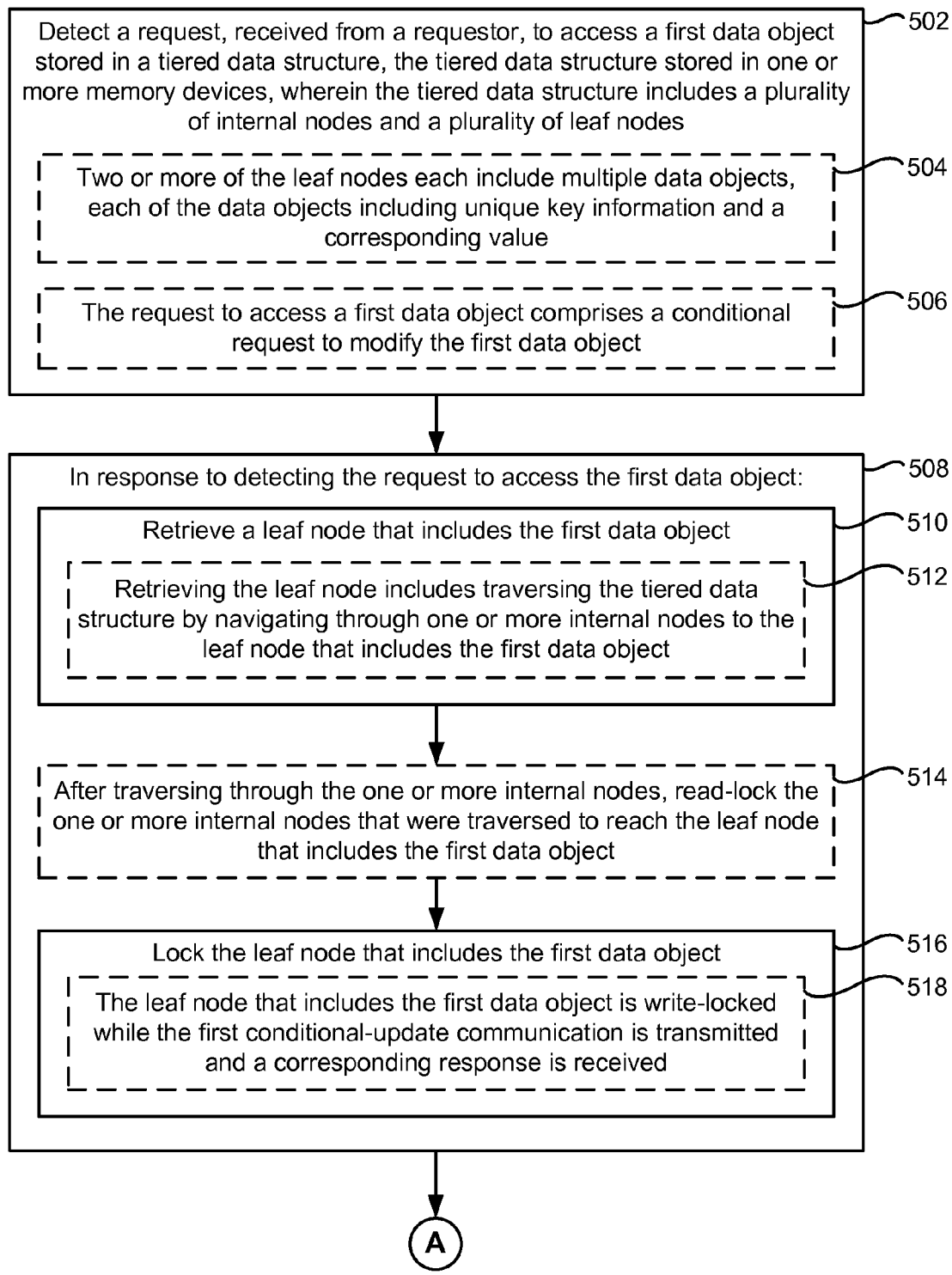
FIGS. 5A-5C illustrate a method of performing conditional updates for reducing frequency of data modification operations (e.g., in a tiered data structure), in accordance with some embodiments.
Figure 5B:
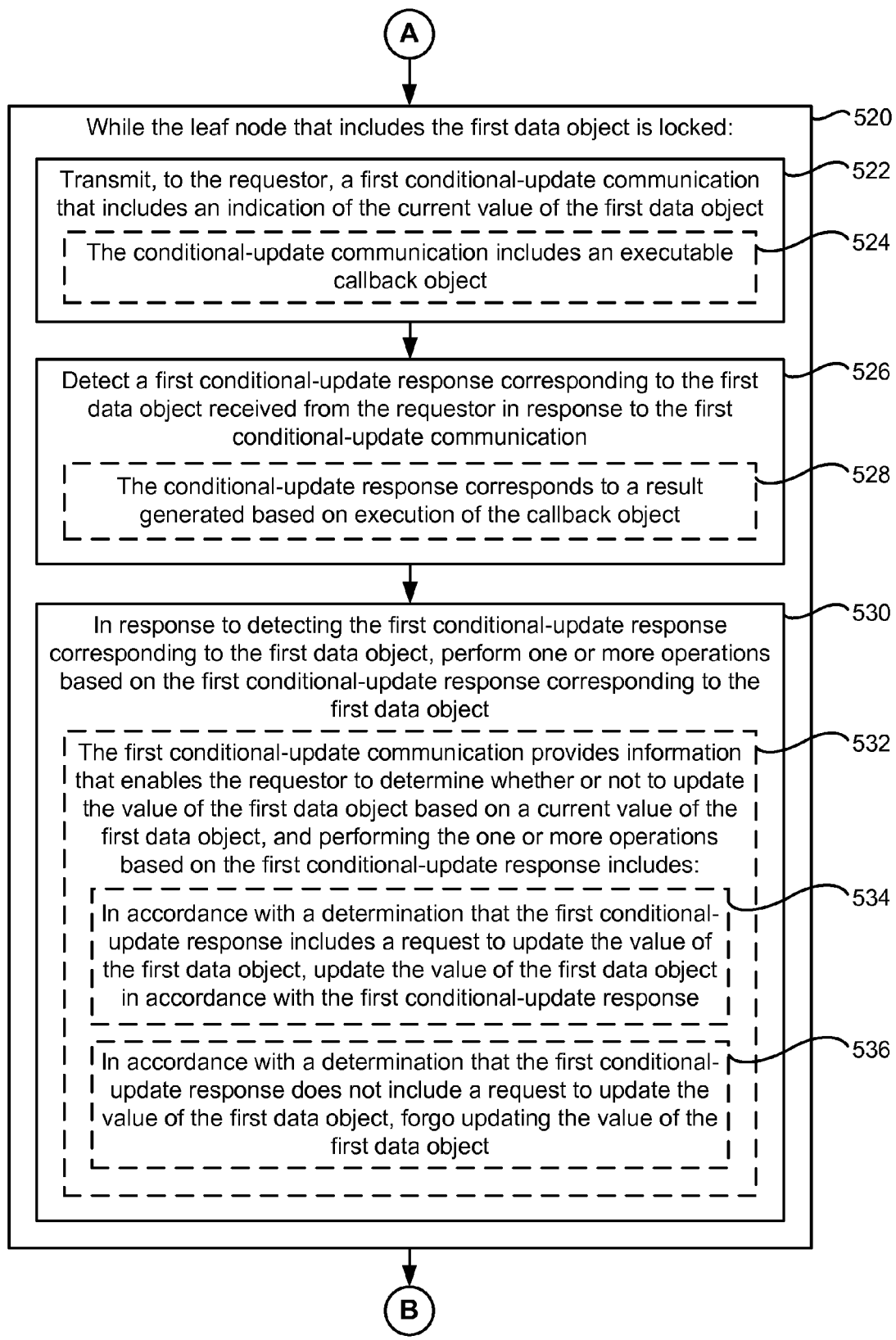
Figure 5C:
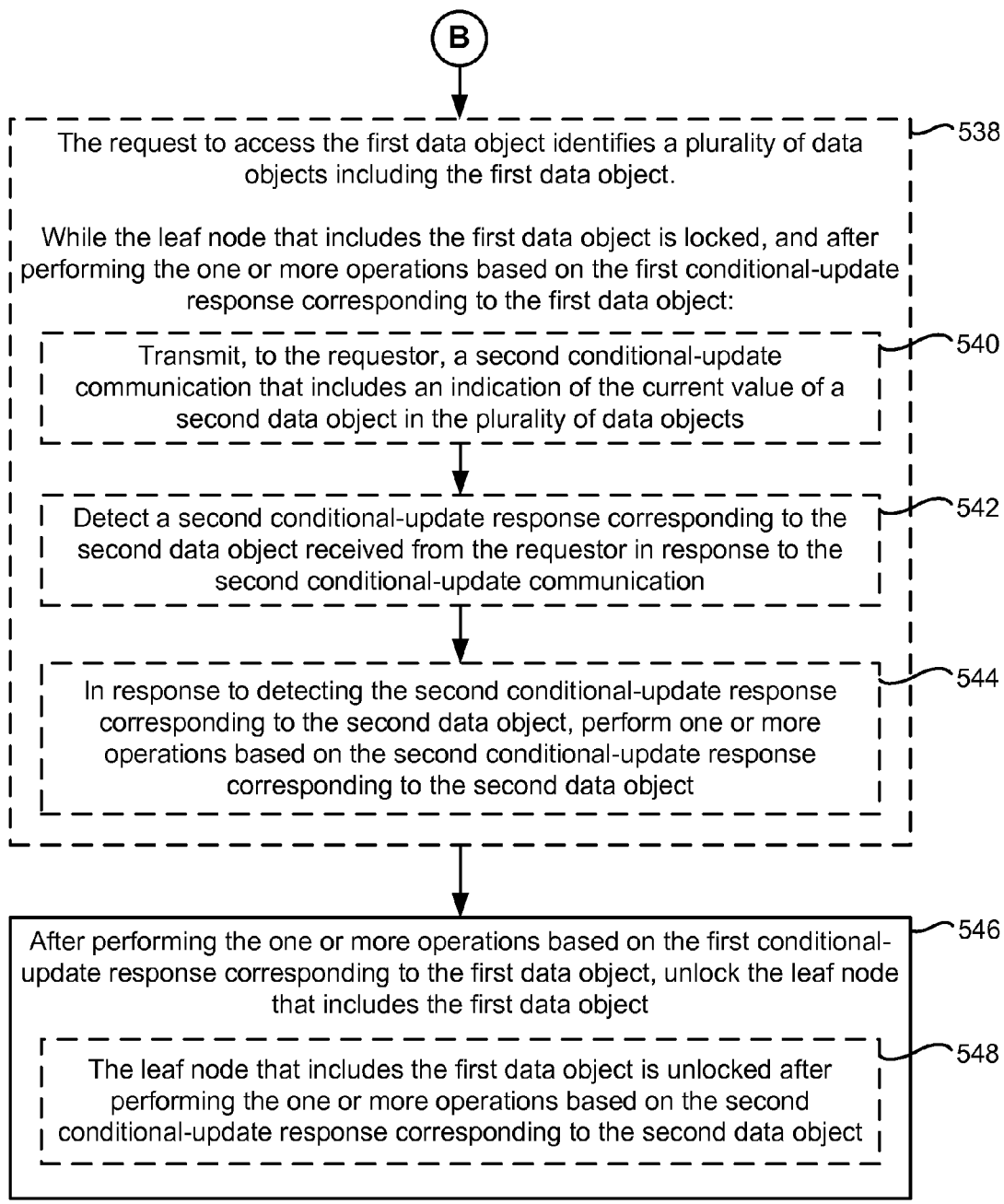
Figure 6A:
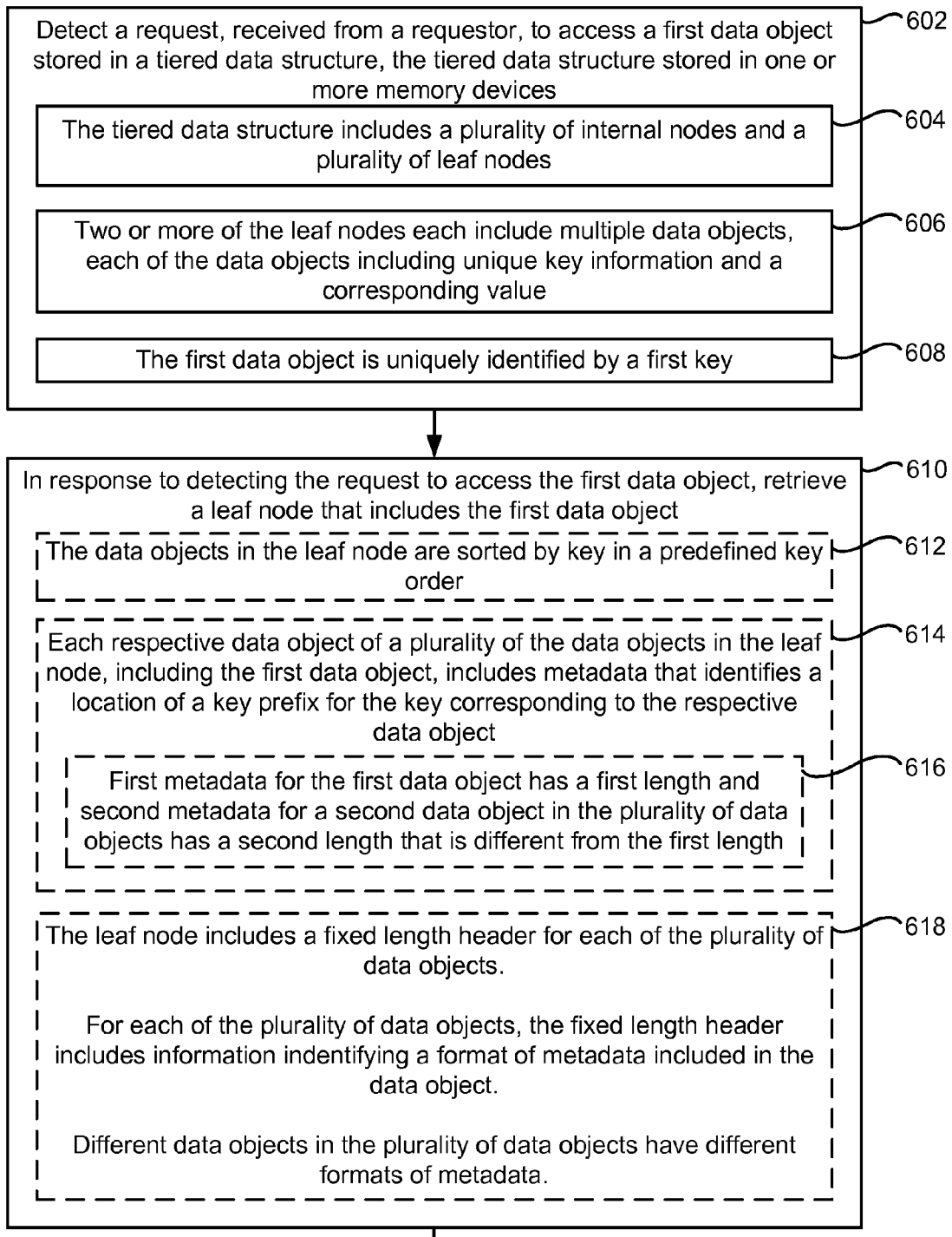
FIGS. 6A-6D illustrate a method of compaction of information in a tiered data structure, in accordance with some embodiments.
Figure 6B:
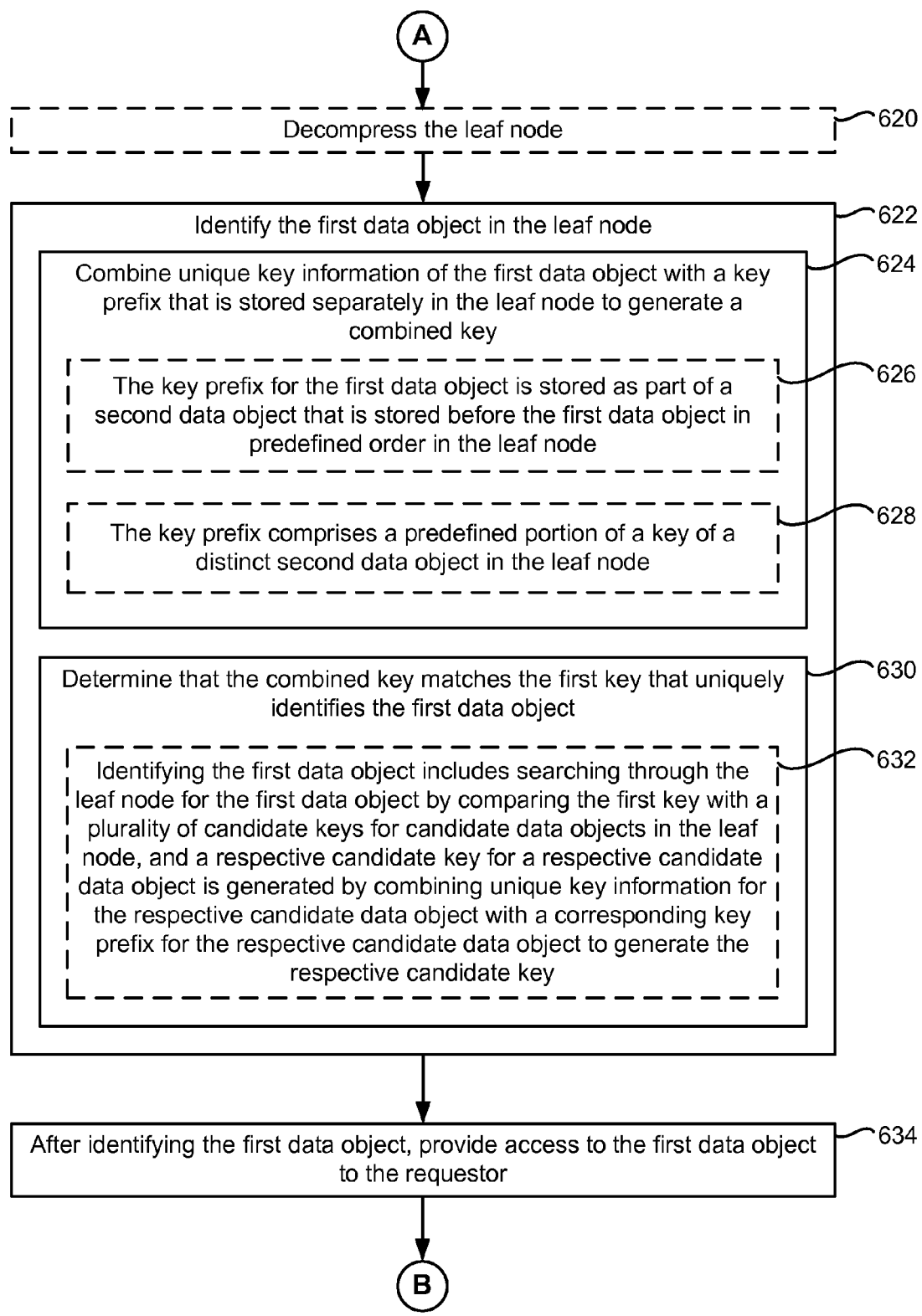
Figure 6C:
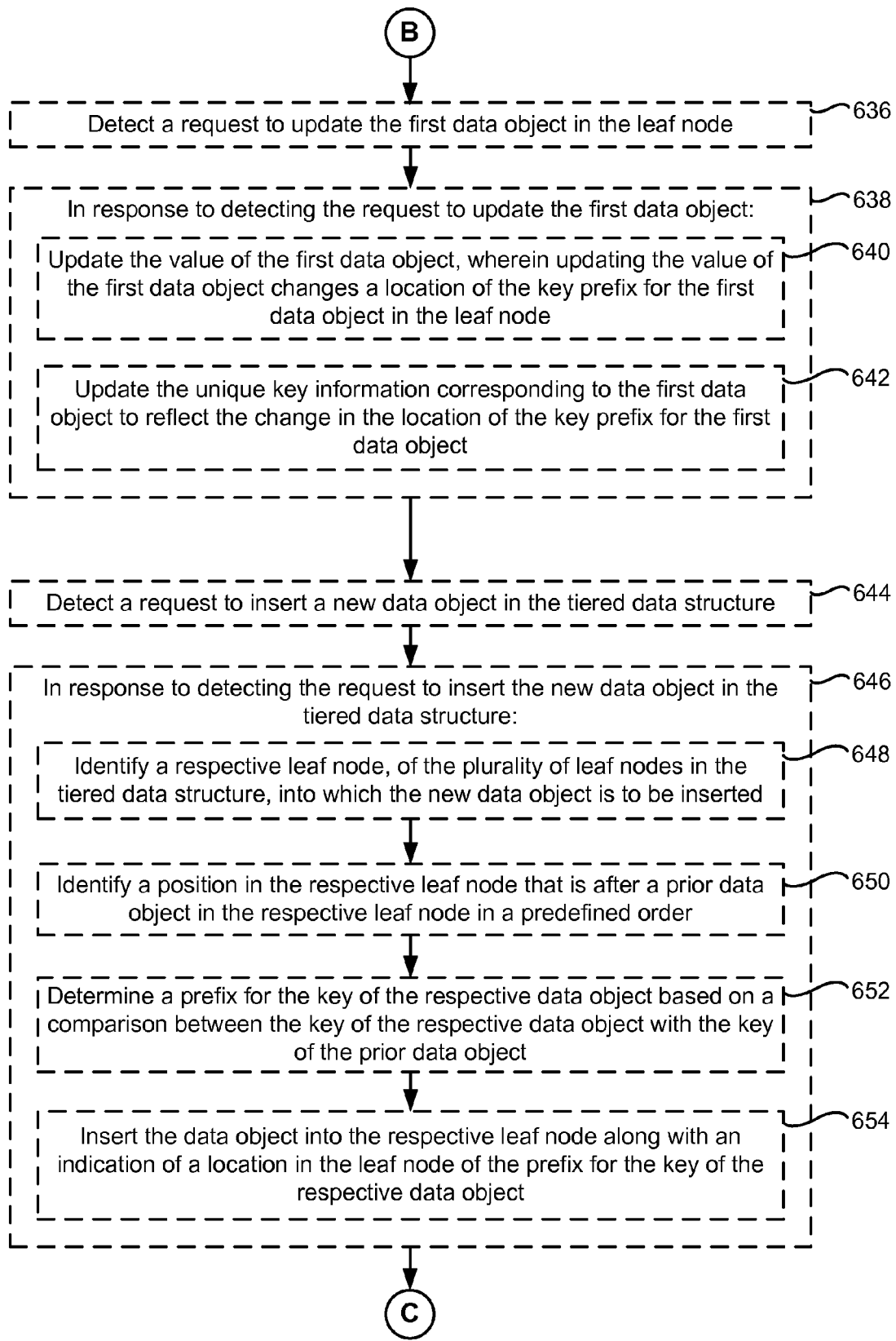
Figure 6D:
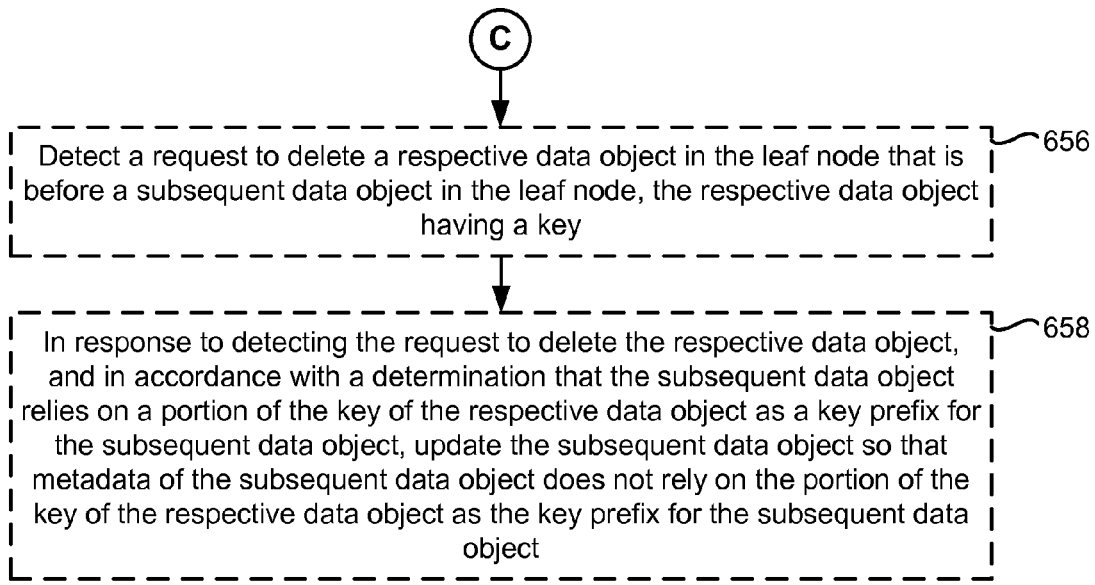

After identifying the leaf node that includes the requested data object, computer system 102 locks (323) the leaf node that includes the requested data object, as shown in FIG. 5C, where leaf node 306-4 is locked, and performs one or more additional operation (e.g., operations 324-326), while the leaf node is locked (e.g., read or read/write locked). After locking the leaf node, computer system 102 transmits (324) a conditional-update communication to a requestor, detects (325) a constitutional update response, and performs (326) one or more operations based on the conditional update response. For example, computer system 102 performs a conditional write operation where the requestor decides whether or not to perform the write operation based on the current value of the data object. As another example, computer system 102 performs a read-modify-write operation by returning a current value of the data object to the requestor in the conditional-update communication. Other examples of conditional update operations include "fetch and op" operations and "compare and swap" operations. In circumstances where the condition for the conditional update operation is not met, then the operation performed based on the conditional-update response optionally includes deciding not to perform any update on the requested data object.

In some circumstances, the detected request (e.g., detected in operation 320) includes a request to access multiple data objects that are in a single leaf node, in which case operations 324-326 are, optionally, repeated for two or more of the multiple data objects, so as to reduce the number of traversals of tiered data structure 104. After the operation(s) based on the conditional-update response have been performed, computer system 102 unlocks (328) the leaf node (e.g., leaf node 306-4) that was locked in response to the request to access the requested data object. Additional details regarding performing conditional updates for reducing frequency of data modification operations (e.g., in a tiered data structure) are described below with reference to method 500 and FIGS. 5A-5C.

Figure 3D:
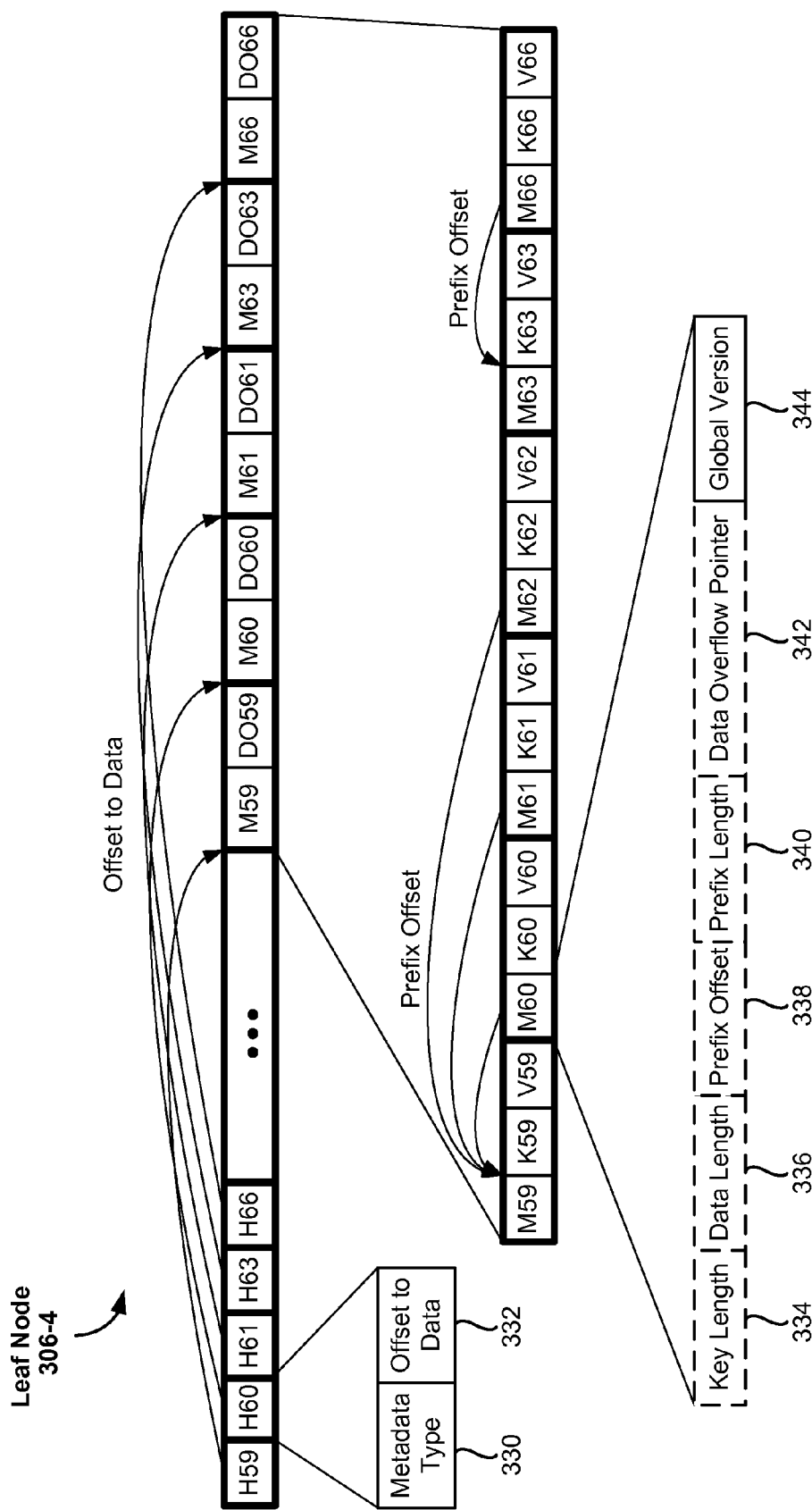
Figure 3E:
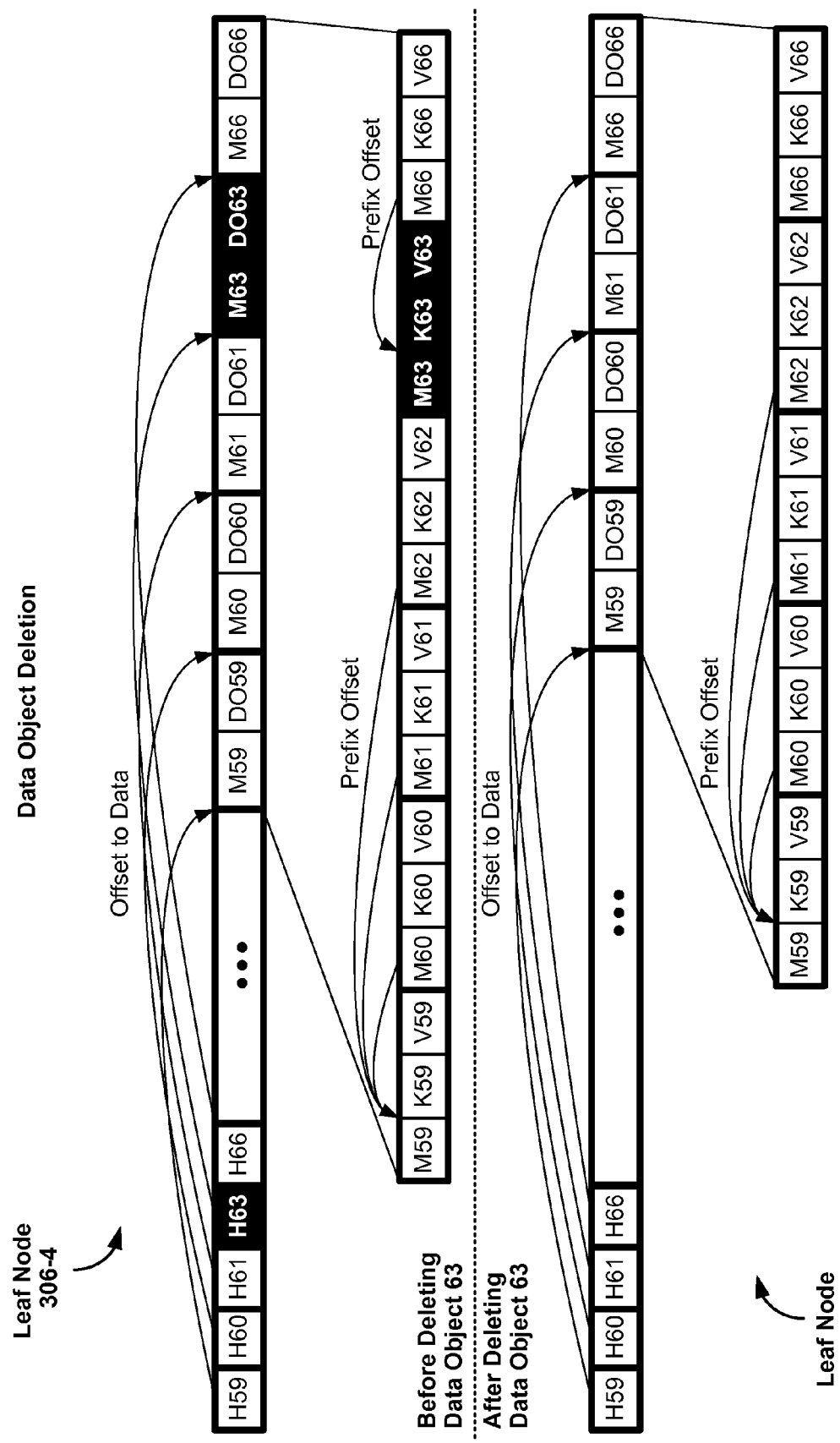
Figure 3F:
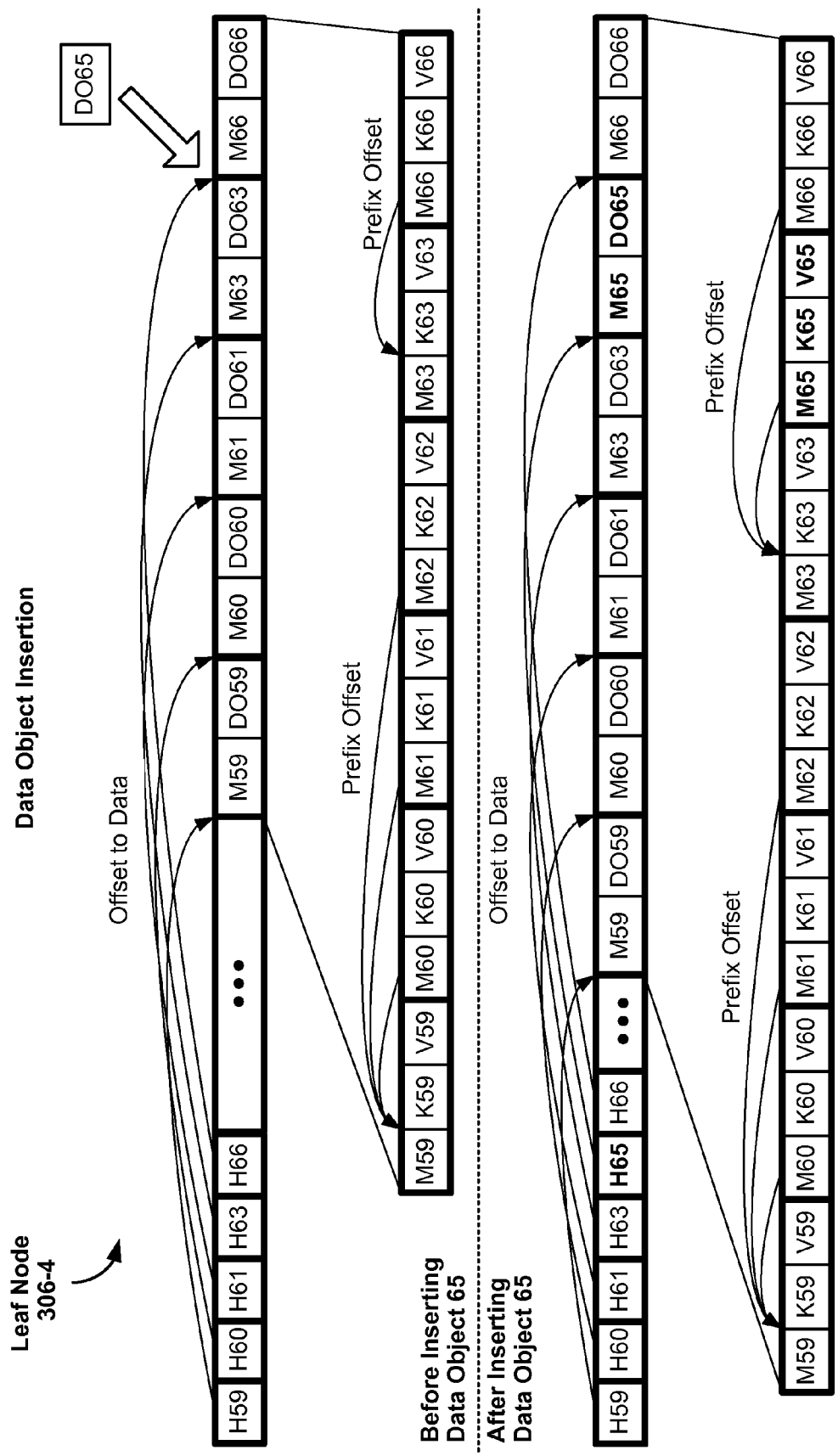
Figure 4A:
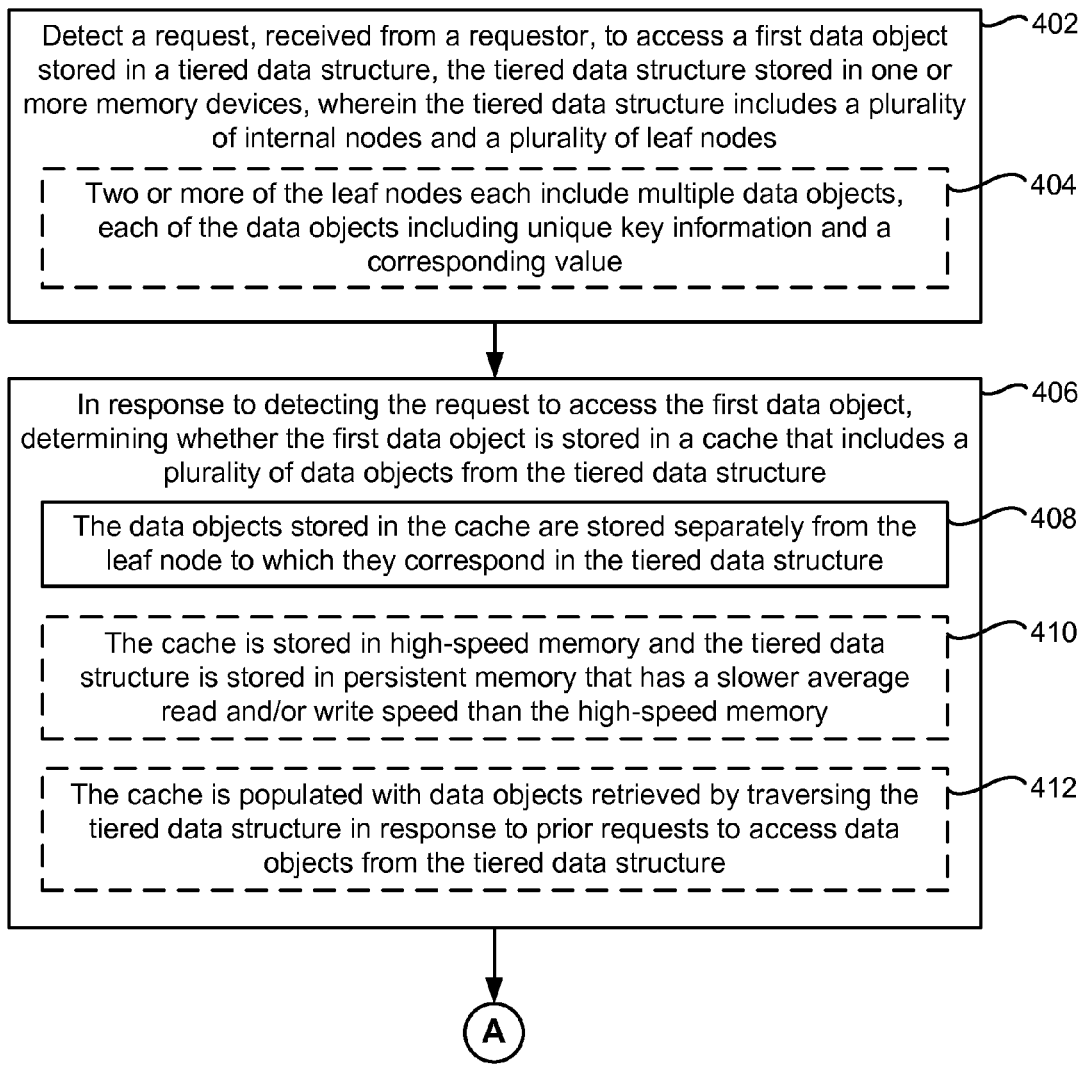
FIGS. 4A-4E illustrate a method of efficient cache utilization in a tiered data structure, in accordance with some embodiments.
Figure 4B:
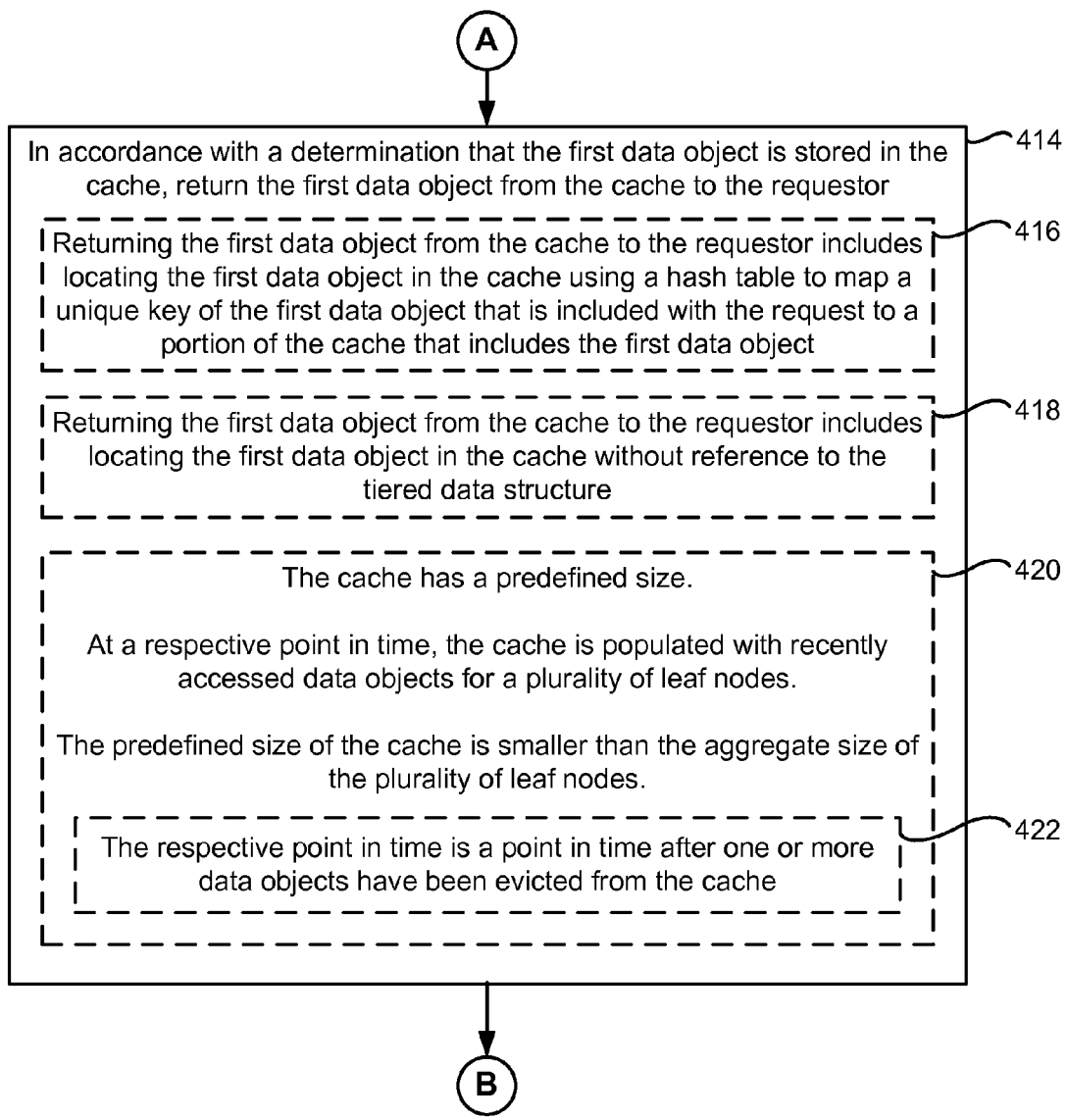
Figure 4C:
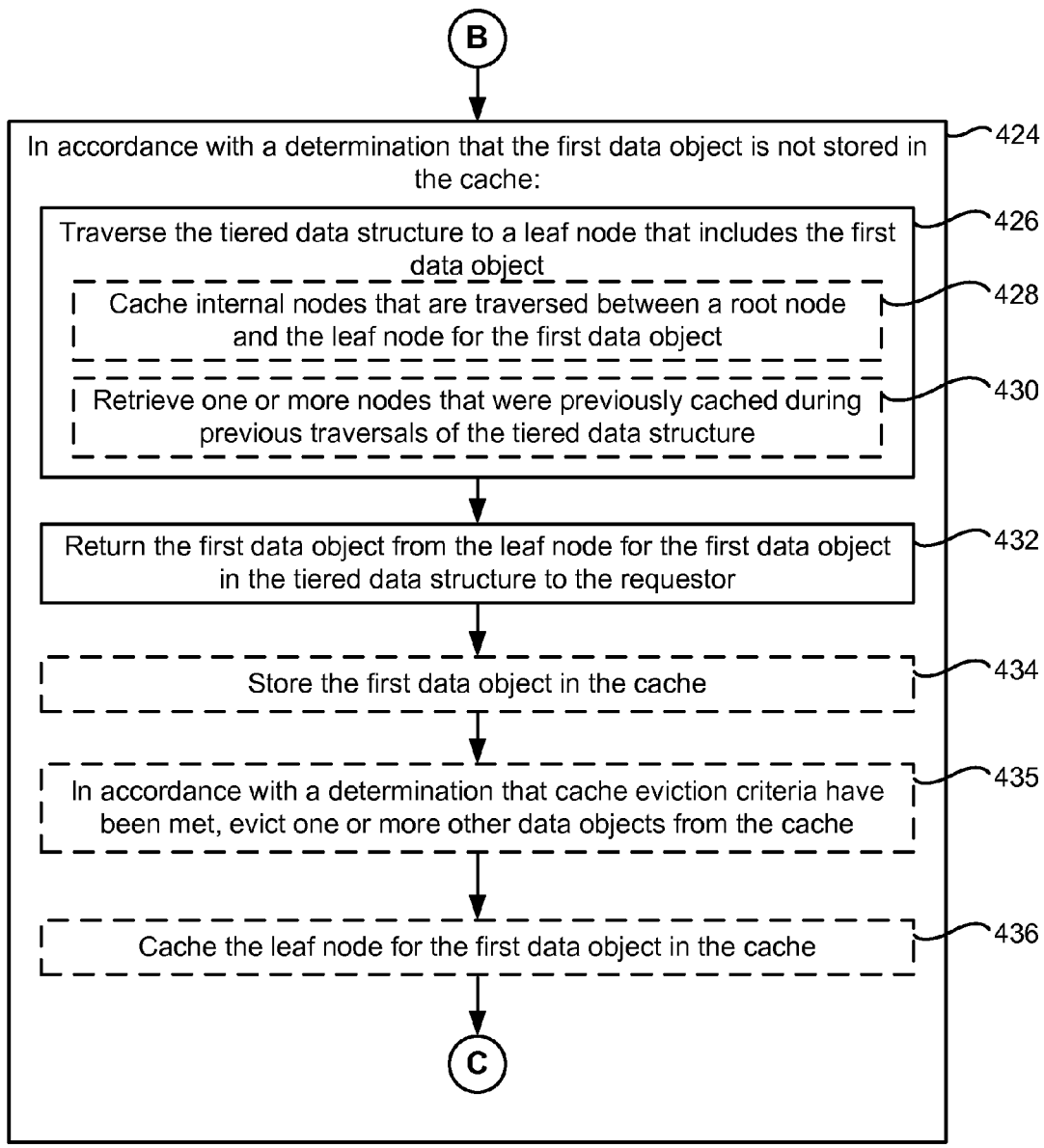
Figure 4D:
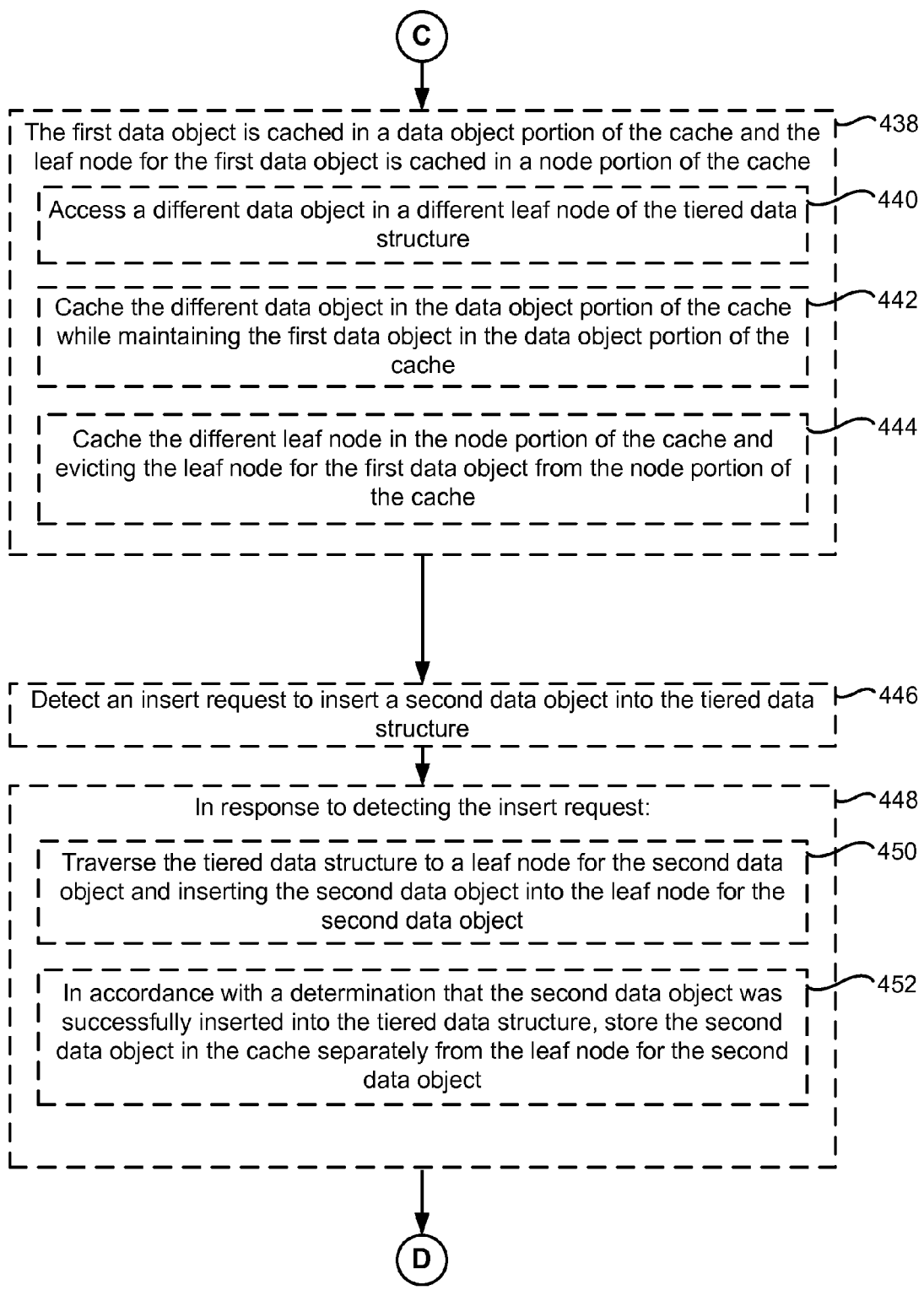
Figure 4E:
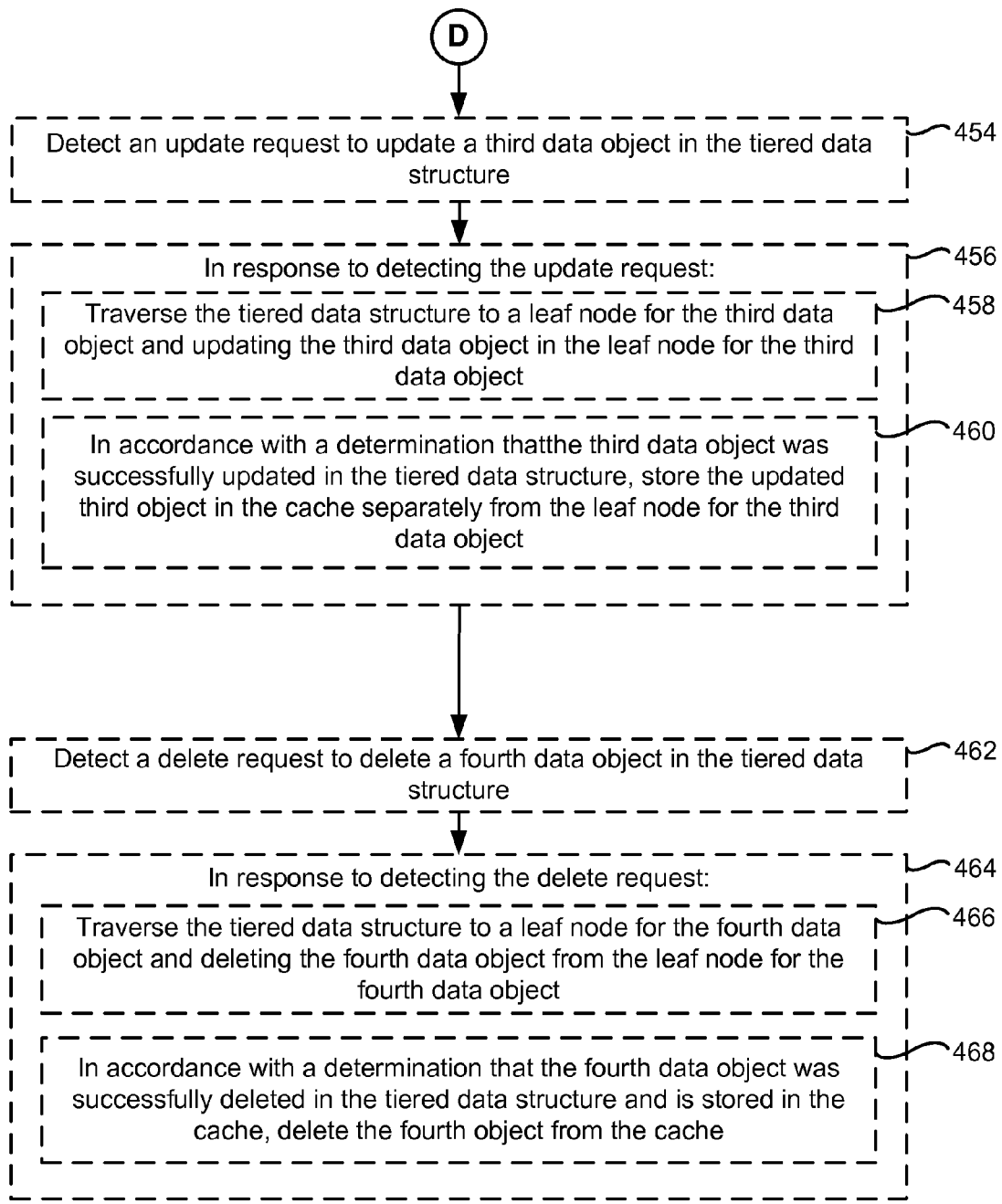

FIGS. 3D-3F illustrate examples of compaction of information in a tiered data structure, in accordance with some embodiments. FIG. 3C shows an example leaf node 306-4 from tiered data structure 104 in FIG. 3A. Leaf node 306-4 includes data for data objects 59, 60, 61, 63 and 66. For each of these data objects (e.g., DO59, DO60, DO61, DO63, DO66), leaf node 306-4 includes a corresponding fixed length header (H59, H60, H61, H63, and H66, respectively) and corresponding metadata (e.g., M59, M60, M61, M63, and M66, respectively). The fixed length headers include a metadata type in embodiments where there are a plurality of different metadata types for metadata of the data objects, and an offset (e.g., a number of bytes) from a particular portion of the leaf node (e.g., a beginning or an end of the leaf node) to the location of the data object in the leaf node. The fixed length headers each have the same length, and can, thus, be used to perform a binary search through data objects in the leaf node. In some embodiments, the fixed length headers are packed to the left in the leaf node and the data objects and metadata are packed to the right in the leaf node, so that there is a growing area in the middle of the leaf node that increases or decreases in size as additional data objects are added to, or removed from, the leaf node. Packing the headers and data objects in different directions enables both the headers and the data objects to have fixed points to refer to when the data objects and nodes are identified by offsets (e.g., the headers can be identified based on an offset from a left edge of the leaf node, and the data objects and metadata can be identified based on an offset from a right edge of the leaf node).

The data objects (e.g., DO59, DO60, DO61, DO63, DO66) in leaf node 306-4 each include unique key information (e.g., K59, K60, K61, K63, K66, respectively) and a corresponding value (e.g., V59, V60, V61, V63, V66, respectively). In some embodiments, the unique key information for some of the data objects is a full unique key for the data objects, while the unique key information for other data objects is a portion of a unique key for the data objects, and the metadata for these data objects indicates a location of a key prefix that is shared with one or more other data objects that can be used to recreate the unique key for the data object in combination with the unique key information stored with the data object. For example, data object 59 includes a full unique key in unique key information K59, while data object 60 includes a partial key in unique key information K60 and metadata M60 associated with data object 60 is used to identify a location of a key prefix (e.g., a portion of K59 that serves as a key prefix for data object 60 and, in combination with unique key information K60 can be used to determine a unique key for data object 60). Similarly, data object 61 includes a partial key in unique key information K61 and metadata M61 associated with data object 61 is used to identify a location of a key prefix (e.g., a portion of K59 that serves as a key prefix for data object 61 and, in combination with unique key information K61 can be used to determine a unique key for data object 61).

Metadata (e.g., M59, M60, M61, M63, and M66) for a corresponding data object optionally includes one or more of the following: key length information 334 indicating a length of unique key information associated with the corresponding data object; data length information 336 indicating a length of the corresponding data object or the value of the corresponding data object; prefix offset information 338 that indicates a location of a start of a key prefix for the corresponding data object; prefix length information 340 that indicates a length of the key prefix for the corresponding data object; data overflow pointer 342 that indicates a location of data for the corresponding data object that is too large to fit in the leaf node; and global version information 344 that indicates a version of the corresponding data object. In some embodiments, the global version information 344 includes information identifying the order of each change to data objects in tiered data structure 104 (FIGS. 1 and 2) or data objects in data storage system 101 (FIGS. 1 and 2), which can be used to determine whether a change to a first data object occurred before or after a change to a second, different, data object.

In some embodiments different data objects have different types of metadata with different lengths, sometimes called variable-length metadata. Using variable length metadata enables shorter metadata to be used in many situations, and using shorter metadata increases the number of data objects that can be stored in a leaf node. As one example, there are four types of metadata, type-0 metadata, type-1 metadata, type-2 metadata and type-3 metadata. Type-0 metadata is used when the data object has the same key prefix, key length, and data length as the preceding data object, in which case the metadata includes only global version information 344 (e.g., represented as a 64-bit unsigned integer), and other information such as key prefix location, data length and key length are determined by looking at the metadata corresponding to the preceding data object. Type-1 metadata is used when the data object has a key length and data length that can each fit in a single byte and data that fits in the leaf node, in which case the metadata includes key length information 334 (e.g., represented as an 8-bit unsigned integer), data length information 336 (e.g., represented as an 8-bit unsigned integer), prefix offset information 338 (e.g., represented as an 16-bit unsigned integer), prefix length information 340 (e.g., represented as an 8-bit unsigned integer), and global version information 344 (e.g., represented as a 64-bit unsigned integer). Type-2 metadata is used when the data object has a key length and data length that can each fit in two bytes, in which case the metadata includes key length information 334 (e.g., represented as an 16-bit unsigned integer), data length information 336 (e.g., represented as an 16-bit unsigned integer), prefix offset information 338 (e.g., represented as an 16-bit unsigned integer), prefix length information 340 (e.g., represented as an 16-bit unsigned integer), data overflow pointer 342 (e.g., represented as a 64-bit unsigned integer), and global version information 344 (e.g., represented as a 64-bit unsigned integer). Type-3 metadata is used for data objects that do not fit in the other categories, in which case the metadata includes key length information 334 (e.g., represented as an 32-bit unsigned integer), data length information 336 (e.g., represented as an 32-bit unsigned integer), prefix offset information 338 (e.g., represented as an 16-bit unsigned integer), prefix length information 340 (e.g., represented as an 32-bit unsigned integer), data overflow pointer 342 (e.g., represented as a 64-bit unsigned integer), and global version information 344 (e.g., represented as a 64-bit unsigned integer). Type-3 metadata is the most flexible metadata type, but is also the largest of these four metadata types. Enabling the use of other types of metadata (e.g., type-0, type-1, and type-2) saves space in the leaf node when type-3 metadata is not needed to store all of the relevant metadata for a data object. While the example above describes four types of metadata, the principles described above (e.g., using a shorter formats for metadata where the shorter format enables all of the necessary metadata information to be conveyed by the shorter metadata) would apply equally to other types of metadata and thus, in principle, any number of types of metadata could be used in an analogous manner.

FIG. 3E shows an example, of deleting a data object from leaf node 306-4. In the upper part of FIG. 3E, before data object 63 has been deleted, leaf node 306-4 is shown with highlighting in black to indicate the information in leaf node 306-4 that will be deleted when the deletion operation is performed. After data object 63 has been deleted, header H63 is deleted from leaf node 306-4, as shown in the lower part of FIG. 3E, and the remaining headers (e.g., H59, H60, H61, and H66) are repacked against the left edge of leaf node 306-4. Additionally, after data object 63 has been deleted, data object D063 and corresponding metadata M63 are deleted as shown in the lower part of FIG. 3E, and the remaining data objects (e.g., DO59, DO60, DO61, and D066) and metadata (e.g., M59, M60, M61, and M66) are repacked against the right edge of leaf node 306-4. Additionally, before data object 63 was deleted, data object 66 relied on a portion of the key of data object 63 as a key prefix for data object 66. Thus, after data object 63 and its corresponding unique key information K63 is deleted, data object 66 can no longer rely on the portion of the key of data object 63 as a key prefix. Thus, in FIG. 3E, unique key information K66 for data object 66 is updated to include a full unique key for data object 66, and metadata M66 is updated to include a null value for the prefix offset information to indicate that there is no key prefix for data object 66 and that the unique key information K66 for data object 66 includes a full unique key. Alternatively, in some circumstances, computer system 102 determines that there is another data object (e.g., data object 59) in leaf node 306-4 that is associated with unique key information that could be used as a new key prefix for data object 66, and unique key information K66 is updated to include a portion of the unique key for data object 66 that, when combined with the new key prefix can be used to generate the full unique key for data object 66, and metadata M66 is updated to point to unique key information (e.g., K59) for the other data object so that a portion of unique key information (e.g., K59) for the other data object can be used as a key prefix for data object 66. Additionally, in many circumstances, repacking the data objects and headers as described above after deleting data object 63 will change locations of data objects, metadata and headers relative to the locations from which offsets identifying locations of these elements are measured, and thus after a data object, header, and metadata have been deleted, computer system 102 updates the offset information in the header and metadata corresponding to one or more of the other data objects (e.g., data objects that remain in leaf node 306-4 after to deleting data object 63).

FIG. 3F shows an example, of adding a data object from leaf node 306-4. In the upper part of FIG. 3F, before data object 65 has been added, leaf node 306-4 is shown with data object DO65 that is to be added to leaf node 306-4. After data object 65 has been added, new header H65 is added in between header H63 and header H66, as shown in the lower part of FIG. 3F, and the headers (e.g., H59, H60, H61, H63, H65, and H66) are repacked against the left edge of leaf node 306-4. Additionally, after data object 65 has been added, data object DO65 and corresponding metadata M65 are added to leaf node 306-4 as shown in the lower part of FIG. 3F, and the data objects (e.g., DO59, DO60, DO61, DO63, DO65, and DO66) and metadata (e.g., M59, M60, M61, M63, M65, and M66) are repacked against the right edge of leaf node 306-4. Additionally, before data object 65 was added, data object 66 relied on a portion of the key of data object 63 as a key prefix for data object 66 and data object 63 was adjacent to metadata M66 for data object 66. Thus, after data object 65 is added in between data object 63 and data object 66, metadata M66 of data object 66 is updated to indicate a different offset for the key prefix for data object 66, because the relative position between metadata M66 and unique key information K63 has changed. Moreover, in FIG. 3F, newly added data object 65 is also able to use a portion of unique key information K63 as a key prefix, and thus metadata M65 of data object 65 is updated to identify a portion of K63 as a key prefix that can be combined with unique key information K65 to generate a full unique key for data object 65. Additionally, in many circumstances, repacking the data objects and headers as described above after adding data object 65 will change locations of data objects, metadata and headers relative to the locations from which offsets identifying locations of these elements are measured, and thus after a new data object, new header and new metadata have been inserted, computer system 102 updates the offset information in the header and metadata corresponding to one or more of the other data objects (e.g., data objects that were in leaf node 306-4 prior to adding data object 65).

In some situations one or more data objects are updated without adding or deleting a data object from leaf node 306-4. However, even though a data object has not been added or deleted, updating a data object will, in some circumstances change a size of the data object (e.g., by changing a type of metadata used by the data object to a smaller or larger size of metadata or by changing a length of the data to a smaller or larger length). The change in the data object or associated metadata will, in many circumstances, change locations of data objects, metadata and headers relative to the locations from which offsets identifying locations of these elements are measured, and thus after a data object or metadata has been updated, computer system 102 updates the offset information in the header and metadata corresponding to one or more of the other data objects. Additional details regarding compaction of information in a tiered data structure are described below with reference to method 600 and FIGS. 6A-6D.

Attention is now directed to FIGS. 4A-4E, which illustrate a method 400 for efficient cache utilization in a tiered data structure, in accordance with some embodiments. Method 400 is, optionally, governed by instructions that are stored in a non-transitory computer readable storage medium and that are executed by one or more processors of one or more computer systems (e.g., computer system 102, FIG. 2). Each of the operations shown in FIGS. 4A-4E typically corresponds to instructions stored in a computer memory or non-transitory computer readable storage medium (e.g., memory 206 of computer system 102 in FIG. 2). The computer readable storage medium optionally (and typically) includes a magnetic or optical disk storage device, solid state storage devices such as Flash memory, or other non-volatile memory device or devices. The computer readable instructions stored on the computer readable storage medium typically include one or more of: source code, assembly language code, object code, or other instruction format that is interpreted or executed by one or more processors. In various embodiments, some operations in method 400 are combined and/or the order of some operations is changed from the order shown in FIGS. 4A-4E.

A computer system (e.g., computer system 102 in FIGS. 1-2) detects (402) a request, received from a requestor (e.g., an internal requestor 108 or an external requestor 110 in FIG. 1), to access a first data object stored in a tiered data structure (e.g., tiered data structure 104 in FIGS. 1 and 3A), the tiered data structure stored in one or more memory devices, wherein the tiered data structure includes a plurality of internal (non-leaf) nodes (e.g., nodes between a root node and the leaf nodes in the tiered data structure) and a plurality of leaf nodes. For example, when the tiered data structure is a B– Tree or B– Tree like structure (e.g., a B+ tree or a B* tree, or the like) that includes a root node, two or more internal (parent) nodes, and two or more leaf (external child) nodes. In a B– Tree, the topmost node is sometimes called the root node. In a B– Tree, an internal node (also known as an inner node, or inode for short, parent node or branch node) is any node of the B– Tree that has child nodes other than the root node. Similarly, in a B– Tree, a leaf node (also known as an outer node, external node, or terminal node) is any node that does not have child nodes.

In some circumstances, two or more of the leaf nodes each include (404) multiple data objects, each of the data objects including unique key information (e.g., a unique key or information from which a unique key can be identified such as a shortened key and a location/length of a key prefix) and a corresponding value. In some embodiments, the corresponding value is data. In some embodiments, the corresponding value is a pointer identifying a location where the data is stored. In some embodiments, the data objects are contiguous data objects where the unique key information for a respective contiguous data object is adjacent or substantially adjacent to the corresponding value for the respective contiguous data object or other data for the respective contiguous data object that is adjacent to the corresponding value. In some embodiments, the data objects are split data objects where the unique key information for a respective split data object is separated from the corresponding value for the respective split data object by other data for other data objects and the unique key information for the respective split data object is stored with a pointer that identifies a location of the corresponding value for the respective split data object.

In response to detecting the request to access the first data object, the computer system determines (406) whether the first data object is stored in a cache (e.g., data object cache portion 106-1 in FIGS. 1 and 3B) that includes a plurality of data objects from the tiered data structure. The data objects stored in the cache are stored separately from the leaf node to which they correspond in the tiered data structure (e.g., such that a first data object can be retrieved from the cache without retrieving a leaf node that includes data objects that are adjacent to the first data object and without traversing through one or more internal nodes of the tiered data structure). In some embodiments, some or all of the cache is in memory of the computer system. In some embodiments some or all of the cache is remote from the computer system and the cache is (operatively) in communication with the computer system via one or more communication systems.

In some embodiments, the cache is stored (410) in high-speed memory (e.g., RAM or other non-persistent memory with a high read/write rate that loses stored information when power is shut off to the memory, or even high-speed persistent memory). In some circumstances, high-speed persistent memory is more expensive than slower persistent memory and thus the amount of high-speed persistent memory is smaller than the amount of slower persistent memory, so as to reduce device cost. In some embodiments, the tiered data structure is stored in persistent memory that has a slower average read and/or write speed than the high-speed memory (e.g., wherein the persistent memory is flash memory, any suitable three-dimensional non-volatile memory such as vertical NAND, RRAM (also called ReRAM), etc., hard drive disks, or other persistent memory that maintains its state even when power is shut off to the memory). In some embodiments, the cache is populated (412) with data objects retrieved by traversing the tiered data structure in response to prior requests to access data objects from the tiered data structure.

After determining whether the first data object is stored in the cache, in accordance with a determination that the first data object is stored in the cache, the computer system returns (414) the first data object from the cache to the requestor. For example, data object 25 is retrieved from data object cache portion 106-1 in response to request 2 in FIG. 3B, as described in greater detail above. In some circumstances, even when the first data object is stored in the cache, one or more other data objects included in the leaf node for the first data object are not included in the cache (e.g., because those data objects are not frequently used data objects). For example in FIG. 3B, leaf node 306-2 and data objects 26-30 (which are stored in leaf node 306-2 along with data object 25) are not stored in data object cache portion 106-1, even though data object 25 is stored in data object cache portion 106-1. Forgoing storing some data objects from one or more leaf nodes instead of storing the whole leaf node improves the utility of the cache because more of the frequently used data objects can be stored in the cache than if full leaf nodes were stored in the cache, because less frequently used data objects that happen to reside in the same leaf node as more frequently used objects do not need to be stored in the cache. In many circumstances (e.g., where frequently used data objects are distributed among a large number of leaf nodes), storing frequently used data objects in the cache separately from their corresponding leaf nodes effectively increases the size of the cache, as less unnecessary information is stored in the cache.

In some embodiments, returning the first data object from the cache to the requestor includes locating (416) the first data object in the cache using a hash table to map a unique key of the first data object that is included with the request to a portion of the cache (sometimes referred to as a "bucket") that includes the first data object (and, optionally, one or more other data objects which have unique keys that are mapped to the portion of the cache by the hash table). In some embodiments, returning the first data object from the cache to the requestor includes locating (418) the first data object in the cache without reference to the tiered data structure (e.g., without traversing the tiered data structure and without retrieving the leaf node that includes the first data object). In some embodiments, the cache has a predefined size, at a respective point in time, the cache is populated with recently accessed data objects for a plurality of leaf nodes (e.g., in response to prior requests to access the data objects) and the predefined size of the cache is smaller (420) than the aggregate size of the plurality of leaf nodes. For example, more data objects are stored in the cache than could be stored in the cache if each of the data objects was stored with its corresponding leaf node. Thus, in some embodiments, separately caching data objects enables a larger number of recently used data objects to be stored in the cache than would be able to be stored if full leaf nodes were cached, as described above with reference to FIG. 3B. In some embodiments, the respective point in time is a point in time after (422) one or more data objects have been evicted from the cache (e.g., the cache has reached a maximum capacity and one or more least recently used objects, including the one or more evicted data objects, have been being evicted from the cache to make room for more recently used objects).

After determining whether the first data object is stored in the cache, in accordance with a determination that the first data object is not stored (424) in the cache (e.g., because a search for the first data object in the cache failed to find the first data object in the cache), the computer system traverses (426) the tiered data structure to a leaf node that includes the first data object. In some embodiments, in conjunction with traversing the tiered data structure to the leaf node for the first data object, the computer system caches (428) internal nodes that are traversed between a root node and the leaf node for the first data object. For example in FIG. 3B, internal node 304-4 is cached after being used to retrieve data object 70 in response to request 3. In some embodiments, the nodes are cached in the same cache as the data objects (e.g., cache 106 in FIGS. 1 and 3B). In some embodiments, the nodes are cached in a node cache (e.g., node cache portion 106-2 in FIGS. 1 and 3B) that is separate from the data object cache (e.g., data object cache portion 106-1 in FIGS. 1 and 3B) used for the data objects. In some embodiments, the leaf node for the first data object is also cached. In some embodiments, the node cache is smaller than the data object cache. In some embodiments, the node cache can store a smaller number of nodes than the data object cache can store data objects. The node cache is, optionally, governed by a least recently used (LRU) cache eviction policy so that when new nodes are stored in the node cache, the least recently used nodes in the node cache are evicted to make room for the new nodes. In some embodiments, traversing the tiered data structure to the leaf node for the first data object includes retrieving (430) one or more nodes that were previously cached (e.g., stored in a node portion of the cache or in a separate node cache) during previous traversals of the tiered data structure (e.g., in response to prior requests to access data objects). For example, in FIG. 3B, internal nodes 304-1 and 304-3 are used to respond to request 1.

After traversing the tiered data structure, the computer system returns (432) the first data object from the leaf node for the first data object in the tiered data structure to the requestor. In some embodiments, in accordance with a determination that the first data object is not stored in the cache, after returning the first data object from the leaf node for the first data object, the computer system stores (434) the first data object in the cache. In some embodiments, in conjunction with storing the first data object in the cache, in accordance with a determination that cache eviction criteria have been met, the computer system evicts (435) one or more other data objects from the cache (e.g., evicting the least recently used data objects in accordance with a least recently used (LRU) cache eviction policy or evicting the oldest data objects in accordance with a first in first out (FIFO) cache eviction policy). In some embodiments, the computer system also caches (436) the leaf node for the first data object in the cache. For example, in FIG. 3B, leaf node 306-4 that includes data object 61 is cached in node cache portion 106-2 when data object 61 is retrieved and cached in data object cache portion 106-1.

In some embodiments, the cache has a data object portion (e.g., data object cache portion 106-1 in FIGS. 1 and 3B) for storing data objects separately from their corresponding leaf nodes and a node portion (e.g., node cache portion 106-2 in FIGS. 1 and 3B) for storing leaf nodes and internal nodes of the tiered data structure. In some embodiments, in conjunction with returning the first data object from the leaf node for the first data object in the tiered data structure to the requestor (e.g., when the first data object is not stored in the cache), the computer system caches (438) the first data object in the data object portion of the cache and caches the leaf node for the first data object in the node portion of the cache. After caching the first data object and the leaf node for the first data object, the computer system accesses (440) a different data object in a different leaf node of the tiered data structure (e.g., in response to detecting a request to access the different data object received from the requestor or another, different, requestor). In conjunction with accessing the different data object, the computer system caches (442) the different data object in the data object portion of the cache while maintaining the first data object in the data object portion of the cache and caches (444) the different leaf node in the node portion of the cache and evicts the leaf node for the first data object from the node portion of the cache. In some embodiments, the leaf node for the first data object is evicted before caching the different leaf node to make room for the different leaf node. For example in FIG. 3B, in response to request 3, leaf node 306-3 is evicted from node cache portion 106-2, while data object 58 (which is from leaf node 306-3) remains in data object cache portion 106-1.

In some circumstances, the computer system detects (446) an insert request to insert a second data object into the tiered data structure. In some embodiments, in response (448) to detecting the insert request, the computer system traverses (450) the tiered data structure to a leaf node for the second data object and inserting the second data object into the leaf node for the second data object (e.g., the leaf node for the first data object or another leaf node that is different from the leaf node for the first data object). In some embodiments, inserting the second data object in the tiered data structure causes a leaf node and optionally one or more internal nodes to be split. In some embodiments, in accordance with a determination that the second data object was successfully inserted into the tiered data structure, the computer system stores (452) the second data object in the cache separately from the leaf node for the second data object. In some embodiments, if the second data object is not successfully inserted into the tiered data structure, the computer system forgoes storing the second data object in the cache (e.g., the second data object is not stored in the cache) and an error message is optionally sent to the requestor indicating that the second data object was not inserted.

In some circumstances, the computer system detects (454) an update request to update a third data object in the tiered data structure. In some embodiments, in response (456) to detecting the update request, the computer system traverses (458) the tiered data structure to a leaf node for the third data object and updating the third data object in the leaf node for the third data object (e.g., the leaf node for the first data object or another leaf node that is different from the leaf node for the first data object). In some embodiments, in accordance with a determination that the third data object was successfully updated in the tiered data structure, the computer system stores (460) the updated third object in the cache separately from the leaf node for the third data object. In some embodiments, if the third data object is not successfully updated in the tiered data structure, the computer system forgoes updating the third data object in the cache (e.g., the third data object is not updated in the cache) and an error message is optionally sent to the requestor indicating that the third data object was not updated. In some embodiments, if a prior version of the third data object is already in the cache, then storing the updated third object in the cache includes updating/replacing the prior version of the third data object in the cache with the updated third object, whereas if a prior version of the third object is not stored in the cache, the updated third object is stored in the cache without needing to delete or overwrite a prior version of the third object.

In some circumstances, the computer system detects (462) a delete request to delete a fourth data object in the tiered data structure. In some embodiments, in response (464) to detecting the delete request, the computer system traverses (466) the tiered data structure to a leaf node for the fourth data object and deleting the fourth data object from the leaf node for the fourth data object (e.g., the leaf node for the first data object or another leaf node that is different from the leaf node for the first data object). In some embodiments, deleting the fourth data object in the tiered data structure causes two or more leaf nodes and, optionally, two or more internal nodes to be combined. In some embodiments, in accordance with a determination that the fourth data object was successfully deleted in the tiered data structure and is stored in the cache, the computer system deletes (468) the fourth object from the cache. In some embodiments, if the fourth data object is not successfully deleted from the tiered data structure, the computer system forgoes deleting the fourth data object from the cache (e.g., the fourth data object is not deleted from the cache) and an error message is optionally sent to the requestor indicating that the fourth data object was not deleted. In situations where the fourth object is not stored in the cache (e.g., in accordance with a determination that the fourth object is not in the cache), the fourth object does not need to be deleted from the object cache.

It should be understood that the particular order in which the operations in FIGS. 4A-4E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 500 and 600) are also applicable in an analogous manner to method 400 described above with respect to FIGS. 4A-4E. For example, the tiered data structures, data objects, nodes, and unique key information, described above with reference to method 400 optionally have one or more of the characteristics of the tiered data structures, data objects, nodes, and unique key information described herein with reference to other methods described herein (e.g., method 500 and 600). For brevity, these details are not repeated here.

Attention is now directed to FIGS. 5A-5C, which illustrate a method 500 for performing conditional updates for reducing frequency of data modification operations (e.g., in a tiered data structure), in accordance with some embodiments. Method 500 is, optionally, governed by instructions that are stored in a non-transitory computer readable storage medium and that are executed by one or more processors of one or more computer systems (e.g., computer system 102, FIG. 2). Each of the operations shown in FIGS. 5A-5C typically corresponds to instructions stored in a computer memory or non-transitory computer readable storage medium (e.g., memory 206 of computer system 102 in FIG. 2). The computer readable storage medium optionally (and typically) includes a magnetic or optical disk storage device, solid state storage devices such as Flash memory, or other non-volatile memory device or devices. The computer readable instructions stored on the computer readable storage medium typically include one or more of: source code, assembly language code, object code, or other instruction format that is interpreted or executed by one or more processors. In various embodiments, some operations in method 500 are combined and/or the order of some operations is changed from the order shown in FIGS. 5A-5C.

A computer system (e.g., computer system 102 in FIGS. 1-2) detects (502) a request, received from a requestor (e.g., an internal requestor 108 or an external requestor 110 in FIG. 1), to access a first data object stored in a tiered data structure (e.g., tiered data structure 104 in FIGS. 1 and 3A), the tiered data structure stored in one or more memory devices, wherein the tiered data structure includes a plurality of internal (non-leaf) nodes (e.g., nodes between a root node and the leaf nodes in the tiered data structure) and a plurality of leaf nodes. For example, when the tiered data structure is a B– Tree or B– Tree like structure (e.g., a B+ tree or a B* tree, or the like) that includes a root node, two or more internal (parent) nodes, and two or more leaf (external child) nodes. In a B– Tree, the topmost node is sometimes called the root node. In a B– Tree, an internal node (also known as an inner node, inode for short, parent node or branch node) is any node of the B– Tree that has child nodes other than the root node. Similarly, in a B– Tree, a leaf node (also known as an outer node, external node, or terminal node) is any node that does not have child nodes.

In some circumstances, two or more of the leaf nodes each include (504) multiple data objects, each of the data objects including unique key information (e.g., a unique key or information from which a unique key can be identified such as a shortened key and a location/length of a key prefix) and a corresponding value. In some embodiments, the corresponding value is data. In some embodiments, the corresponding value is a pointer identifying a location where the data is stored. In some embodiments, the data objects are contiguous data objects where the unique key information for a respective contiguous data object is adjacent or substantially adjacent to the corresponding value for the respective contiguous data object or other data for the respective contiguous data object that is adjacent to the corresponding value. In some embodiments, the data objects are split data objects where the unique key information for a respective split data object is separated from the corresponding value for the respective split data object by other data for other data objects and the unique key information for the respective split data object is stored with a pointer that identifies a location of the corresponding value for the respective split data object. In some embodiments, the request to access a first data object includes (506) a conditional request to modify the first data object (e.g., a request that may or may not result in modifying the first data object depending on one or more conditions such as the current value of the first data object).

In some embodiments, the computer system performs (508) one or more operations in response to detecting the request to access the first data object. The computer system retrieves (510) a leaf node that includes the first data object. In some embodiments, retrieving the leaf node includes traversing (512) the tiered data structure by navigating through one or more internal nodes to the leaf node that includes the first data object, and after traversing through the one or more internal nodes, the computer system read-locks (514) the one or more internal nodes that were traversed to reach the leaf node that includes the first data object. In response to detecting the request to access the first data object, the computer system also locks (516) the leaf node that includes the first data object. In some embodiments, the leaf node that includes the first data object is write-locked (518) while the first conditional-update communication is transmitted and the response is received. For example, in FIG. 3C, leaf node 306-4 is write locked while the conditional-update communication is transmitted and the response is received In order to improve the efficiency of performing the conditional update operation, the computer system performs a plurality of operations while the leaf node that includes the first data object is locked. In particular, while the leaf node that includes the first data object is (520) locked, the computer system transmits (522), to the requestor, a first conditional-update communication that includes an indication of the current value of the first data object. In some embodiments, the conditional-update communication includes (524) an executable callback object.

After transmitting the first conditional-update communication, the computer system detects (526) a first conditional-update response corresponding to the first data object received from the requestor in response to the first conditional-update communication (e.g., based on the indication of the current value of the first data object). In some embodiments, the conditional-update response corresponds (528) to a result generated based on execution of the callback object.

In response to detecting the first conditional-update response corresponding to the first data object, the computer system performs (530) one or more operations based on the first conditional-update response corresponding to the first data object. In some embodiments, the first conditional-update communication provides (532) information that enables the requestor to determine whether or not to update the value of the first data object based on a current value of the first data object and performing the one or more operations based on the first conditional-update response includes determining whether or not the conditional-update response includes a request to update the value of the first data object. In accordance with a determination that the first conditional-update response includes a request to update the value of the first data object, the computer system updates (534) the value of the first data object in accordance with the first conditional-update response. In accordance with a determination that the first conditional-update response does not include a request to update the value of the first data object (e.g., the first conditional-update response includes a request to maintain the value of the first data object or the first conditional-update response includes a request to end the update operation for the first data object without requesting that the value of the first data object be updated), the computer system forgoes (536) updating the value of the first data object (e.g., the first conditional-update response corresponding to the first data object enables performance of an update operation that is not a blind update).

In some circumstances, the request to access the first data object identifies (538) a plurality of data objects including the first data object. In some embodiments, while the leaf node that includes the first data object is locked, and after performing the one or more operations based on the first conditional-update response corresponding to the first data object, the computer system transmits (540), to the requestor, a second conditional-update communication that includes an indication of the current value of a second data object in the plurality of data objects. The computer system subsequently detects (542) a second conditional-update response corresponding to the second data object received from the requestor in response to the second conditional-update communication (e.g., based on the indication of the current value of the second data object) and, in response to detecting the second conditional-update response corresponding to the second data object, the computer system performs (544) one or more operations based on the second conditional-update response corresponding to the second data object. In some embodiments, this process is repeated for a number of different data objects in a predefined (key) order until an object is reached that is not in the leaf node that includes the first data object (e.g., as shown above in FIG. 3C with reference to operations 324-326).

After performing the one or more operations based on the first conditional-update response corresponding to the first data object, the computer system unlocks (546) the leaf node that includes the first data object (e.g., so that other read and/or write operations can be performed on the leaf node and/or data objects contained therein). For example, in FIG. 3C, leaf node 306-4 is unlocked in tiered data structure 104 after performing the operations based on the conditional-update response. In some embodiments (e.g., when the request to access the first data object identifies a plurality of data objects including the first data object), the leaf node that includes the first data object is unlocked after performing (548) the one or more operations based on the second conditional-update response corresponding to the second data object. For example, the leaf node that includes the first data object is unlocked in response to a determination that the request to access the first data object does not identify any additional data objects in the leaf node that includes the first data object.

It should be understood that the particular order in which the operations in FIGS. 5A-5C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 400 and 600) are also applicable in an analogous manner to method 500 described above with respect to FIGS. 5A-5C. For example, the tiered data structures, data objects, nodes, and unique key information described above with reference to method 500 optionally have one or more of the characteristics of the tiered data structures, data objects, nodes, and unique key information described herein with reference to other methods described herein (e.g., method 400 and 600). For brevity, these details are not repeated here.

Attention is now directed to FIGS. 6A-6D, which illustrate a method 600 for compaction of information in a tiered data structure, in accordance with some embodiments. Method 600 is, optionally, governed by instructions that are stored in a non-transitory computer readable storage medium and that are executed by one or more processors of one or more computer systems (e.g., computer system 102, FIG. 2). Each of the operations shown in FIGS. 6A-6D typically corresponds to instructions stored in a computer memory or non-transitory computer readable storage medium (e.g., memory 206 of computer system 102 in FIG. 2). The computer readable storage medium optionally (and typically) includes a magnetic or optical disk storage device, solid state storage devices such as Flash memory, or other non-volatile memory device or devices. The computer readable instructions stored on the computer readable storage medium typically include one or more of: source code, assembly language code, object code, or other instruction format that is interpreted or executed by one or more processors. In various embodiments, some operations in method 600 are combined and/or the order of some operations is changed from the order shown in FIGS. 6A-6D.

A computer system (e.g., computer system 102 in FIGS. 1-2) detects (602) a request, received from a requestor (e.g., an internal requestor 108 or an external requestor 110 in FIG. 1), to access a first data object stored in a tiered data structure (e.g., tiered data structure 104 in FIGS. 1 and 3A), the tiered data structure stored in one or more memory devices. The tiered data structure includes (604) a plurality of internal (non-leaf) nodes (e.g., nodes between a root node and the leaf nodes in the tiered data structure) and a plurality of leaf nodes. For example, when the tiered data structure is a B– Tree or B– Tree like structure (e.g., a B+ tree or a B* tree, or the like) that includes a root node, two or more internal (parent) nodes, and two or more leaf (external child) nodes. In a B– Tree, the topmost node is sometimes called the root node. In a B– Tree, an internal node (also known as an inner node, inode for short, parent node or branch node) is any node of the B– Tree that has child nodes other than the root node. Similarly, in a B– Tree, a leaf node (also known as an outer node, external node, or terminal node) is any node that does not have child nodes.

Furthermore, two or more of the leaf nodes each include (606) multiple data objects, each of the data objects including unique key information (e.g., a unique key or information from which a unique key can be identified such as a shortened key and a location/length of a key prefix) and a corresponding value. In some embodiments, the corresponding value is data. In some embodiments, the corresponding value is a pointer identifying a location where the data is stored. In some embodiments, the data objects are contiguous data objects where the unique key information for a respective contiguous data object is adjacent or substantially adjacent to the corresponding value for the respective contiguous data object or other data for the respective contiguous data object that is adjacent to the corresponding value. In some embodiments, the data objects are split data objects where the unique key information for a respective split data object is separated from the corresponding value for the respective split data object by other data for other data objects and the unique key information for the respective split data object is stored with a pointer that identifies a location of the corresponding value for the respective split data object. Additionally, the first data object is (608) uniquely identified by a first key. For example, in FIG. 3D, data object 60 relies on a portion of the key K59 of data object 59 is used, in combination with the unique key information K60 for data object 60 to generate a full unique key that uniquely identifies data object 60.

In response to detecting the request to access the first data object, the computer system retrieves (610) a leaf node that includes the first data object. In some embodiments, the data objects in the leaf node are sorted (612) by key in a predefined key order (e.g., the keys of the data objects in the leaf node are either monotonically increasing or monotonically decreasing from a beginning to an end of the leaf node). In some embodiments, each respective data object of a plurality of the data objects in the leaf node, including the first data object, includes metadata (614) that identifies a location of a key prefix for the key corresponding to the respective data object. In some embodiments, the metadata specifies a location (e.g., an offset to the start of the key prefix) and a length of the key prefix in the leaf node (e.g., metadata M60 for data object 60 includes prefix offset information 338 and prefix length information 340 in FIG. 3D). In some embodiments one or more of the data objects in the leaf node have a null prefix and the entire key is included in the metadata for these data objects with null prefixes. In some embodiments, one or more data objects in the leaf node include a full key and thus do not have metadata that identifies a location of a corresponding key prefix. In some embodiments, first metadata for the first data object has (616) a first length (e.g., metadata M61 for data object 61 is type-0 metadata in FIG. 3D) and second metadata for a second data object in the plurality of data objects has a second length (e.g., metadata M60 for data object 60 is type-1 metadata in FIG. 3D) that is different from the first length. In some embodiments, the first metadata has a first metadata format that is different from a second metadata format of the second data object. In some embodiments the first metadata is part of a contiguous first data object where the first metadata, first unique key information and first value are stored as a contiguous sequence of data (e.g., for data object 61, M61, K61 and V61 are stored contiguously in leaf node 306-4 as shown in FIG. 3D) and the second metadata is part of a contiguous second data object where the second metadata, second unique key information and second value are stored as a contiguous sequence of data (e.g., for data object 60, M60, K60 and V60 are stored contiguously in leaf node 306-4 as shown in FIG. 3D).

In some embodiments, the leaf node includes (618) a fixed length header for each of the plurality of data objects (e.g., headers H59, H60, H61, H63, and H66 in FIG. 3D). In some embodiments, the fixed length headers enable binary searching within the plurality of data objects. For each of the plurality of data objects, the fixed length header includes information identifying a format of metadata included in the data object. In some embodiments, the fixed length header also includes a pointer identifying a location of the data object in the leaf node. In some circumstances, different data objects in the plurality of data objects have different formats of metadata. In some embodiments, the different formats of metadata have different fields and/or different lengths (e.g., so as to increase an amount of data that can be stored in the leaf nodes by using metadata with a reduced size when possible).

In some embodiments, the leaf node, as stored, is compressed. Thus, in some circumstances, when the stored leaf node is retrieved by the computer system it is still compressed. In such circumstances, after retrieving the leaf node and prior to identifying the first data object in the leaf node, the computer system decompresses (620) the leaf node. In some embodiments (e.g., if the content of the leaf node is modified while accessing the leaf node), the leaf node is recompressed after being modified and the compressed, modified, leaf node is stored.

After retrieving the leaf node that includes the first data object and, optionally, decompressing the leaf node, the computer system identifies (622) the first data object in the leaf node. In the process of identifying the first data object in the leaf node, the computer system combines (624) unique key information (e.g., a "shortened" or "truncated" key) of the first data object with a key prefix that is stored separately in the leaf node to generate a combined key. In some embodiments, the key prefix for the first data object is stored (626) as part of a second data object (e.g., as part of the unique key information of the second data information) that is stored before the first data object in predefined order (e.g., a key order) in the leaf node. In some embodiments, the key prefix includes (628) a predefined portion of a key (or unique key information) of a distinct second data object in the leaf node. For example, to retrieve data object 60 from leaf node 306-4, after leaf node 306-4 is retrieved, metadata M60 for data object 60 is retrieved and used to identify a key prefix that is a portion of key K59 for data object 59 and the key prefix (e.g., a specified portion of K59) is combined with unique key information K60 for data object 60 to generate a full unique key (or combined key) for data object 60, which is then available for comparison with the first key for the requested data object.

In the process of identifying the first data object in the leaf node, the computer system also determines (630) that the combined key matches the first key that uniquely identifies the first data object. In some embodiments, identifying the first data object includes (632) searching through the leaf node for the first data object by comparing the first key with a plurality of candidate keys for candidate data objects in the leaf node. For example, the computer system uses a binary search pattern where a middle key in a range of key values is compared to the first key and then if the first key is greater than the middle key a first subrange above the middle key is searched starting with a key in the middle of the first subrange, but if the first key is less than the middle key, a second subrange that is below the middle key is searched starting with a key in the middle of the second subrange. In some embodiments, a respective candidate key for a respective candidate data object is generated by combining unique key information for the respective candidate data object with a corresponding key prefix for the respective candidate data object to generate the respective candidate key. After identifying the first data object, the computer system provides (634) access to the first data object to the requestor.

In some circumstances, the computer system detects (636) a request to update the first data object in the leaf node. In some embodiments, in response (638) to detecting the request to update the first data object, the computer system updates (640) the value of the first data object, wherein updating the value of the first data object changes a location of the key prefix for the first data object in the leaf node. In some embodiments, updating the value of the first data object causes a change in an offset distance from a predefined point in the leaf node (e.g., an offset from a beginning or ending of the leaf node) to the data object that includes the key prefix for the first data object. In some embodiments, in response (638) to detecting the request to update the first data object, the computer system updates (642) the unique key information corresponding to the first data object to reflect the change in the location of the key prefix for the first data object. While changing the value of the respective data object does not change the key of the first data object, a change in size of the first data object will, in some circumstances, cause one or more data objects to be moved around in the leaf node in accordance with the change in size of the first data object. When data objects are moved around in the leaf node, pointers in one or more headers (e.g., offsets specified by one or more fixed length headers) and/or metadata for data objects (e.g., offsets to one or more the key prefixes) will, in some circumstances, be updated to account for the movement of the data objects in the leaf node.

In some circumstances, the computer system detects (644) a request to insert a new data object in the tiered data structure. In some embodiments, in response (646) to detecting the request to insert the new data object in the tiered data structure, the computer system identifies (648) a respective leaf node, of the plurality of leaf nodes in the tiered data structure, into which the new data object is to be inserted and identifies (650) a position in the respective leaf node that is after a prior data object in the respective leaf node in a predefined order. In some embodiments in response (646) to detecting the request to insert the new data object in the tiered data structure, the computer system determines (652) a prefix for the key of the respective data object based on a comparison between the key of the respective data object with the key of the prior data object and inserts (654) the data object into the respective leaf node along with an indication of a location in the leaf node of the prefix for the key of the respective data object. In some embodiments, the computer system also updates metadata (e.g., prefix information) that identifies a location of a prefix for one or more data objects that are after the new data object in the predefined order (e.g., data objects that point to a key prefix in a data object that is before the new data object in the predefined order). An example of adding a data object to a leaf node is described above in greater detail with reference to FIG. 3F.

In some circumstances, the computer system detects (656) a request to delete a respective data object in the leaf node that is before a subsequent data object in the leaf node, the respective data object having a key. In some embodiments, in response to detecting the request to delete the respective data object, and in accordance with a determination that the subsequent data object relies on a portion of the key of the respective data object as a key prefix for the subsequent data object, the computer system updates (658) the subsequent data object so that metadata of the subsequent data object does not rely on the portion of the key of the respective data object as the key prefix for the subsequent data object (e.g., by including the whole key in the subsequent data object or by relying on a portion of a key of a different data object in the leaf node). An example of deleting a data object from a leaf node is described above in greater detail with reference to FIG. 3E.

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 400 and 500) are also applicable in an analogous manner to method 600 described above with respect to FIGS. 6A-6D. For example, the tiered data structures, data objects, nodes, and unique key information described above with reference to method 600 optionally have one or more of the characteristics of the tiered data structures, data objects, nodes, and unique key information described herein with reference to other methods described herein (e.g., method 400 and 500). For brevity, these details are not repeated here.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible (e.g., a NOR memory array). NAND and NOR memory configurations are exemplary, and memory elements may be otherwise configured.

The semiconductor memory elements located within and/ or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration (e.g., in an x-z plane), resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

The term "three-dimensional memory device" (or 3D memory device) is herein defined to mean a memory device having multiple memory layers or multiple levels (e.g., sometimes called multiple memory device levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

One of skill in the art will recognize that this invention is not limited to the two dimensional and three dimensional exemplary structures described but cover all relevant memory structures within the spirit and scope of the invention as described herein and as understood by one of skill in the art.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B and C" is to be construed to require one or more of the listed items, and this phase reads on a single instance of A alone, a single instance of B alone, or a single instance of C alone, while also encompassing combinations of the listed items such as "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method, performed by a computer system having one or more processors and memory, the method comprising:
    detecting a request, received from a requestor, to access a first data object stored in a tiered data structure, the tiered data structure stored in one or more memory devices, wherein the tiered data structure includes a plurality of internal nodes and a plurality of leaf nodes, and wherein the request comprises a conditional request to modify the first data object;
    in response to detecting the request to access the first data object:
        retrieving a leaf node that includes the first data object, wherein the leaf node is a leaf node in the tiered data structure; and
        locking the leaf node that includes the first data object;
    while the leaf node that includes the first data object is locked:
        transmitting, to the requestor, a first conditional-update communication that includes an indication of a current value of the first data object;
        detecting a first conditional-update response to the first conditional-update communication, the detected first conditional-update response received from the requestor and corresponding to the first data object; and
        in response to detecting the first conditional-update response, performing one or more operations based on the first conditional-update response; and
    after performing the one or more operations based on the first conditional-update response, unlocking the leaf node that includes the first data object.

2. The method of claim 1, wherein two or more of the plurality of leaf nodes each include multiple data objects, each of the data objects including unique key information and a corresponding value.

3. The method of claim 1, wherein the leaf node that includes the first data object is write-locked while the first conditional-update communication is transmitted and the first conditional-update response is detected.

4. The method of claim 1, wherein:

retrieving the leaf node includes traversing the tiered data structure by navigating through one or more internal nodes to the leaf node that includes the first data object; and the method further comprises: after traversing through the one or more internal nodes, read-locking the one or more internal nodes that were traversed to reach the leaf node that includes the first data object.

5. The method of claim 1, wherein:

the first conditional-update communication provides information that enables the requestor to determine whether or not to update the value of the first data object based on the current value of the first data object; and performing the one or more operations based on the first conditional-update response includes:
   in accordance with a determination that the first conditional-update response includes a request to update the value of the first data object, updating the value of the first data object in accordance with the first conditional-update response; and
   in accordance with a determination that the first conditional-update response does not include a request to update the value of the first data object, forgoing updating the value of the first data object.

6. The method of claim 1, wherein:

the request to access the first data object identifies a plurality of data objects including the first data object and a second data object, wherein the leaf node that includes the first data object also includes the second data object; and the method further comprises:
   while the leaf node that includes the first data object is locked, and after performing the one or more operations based on the first conditional-update response:
      transmitting, to the requestor, a second conditional-update communication that includes an indication of a current value of the second data object;
      detecting a second conditional-update response to the second conditional-update communication, the detected second conditional-update response received from the requestor and corresponding to the second data object; and
      in response to detecting the second conditional-update response, performing one or more operations based on the second conditional-update response; and
   wherein the leaf node that includes the first data object and second data object is unlocked after the one or more operations based on the second conditional-update response are performed.

7. The method of claim 1, wherein:

the first conditional-update communication includes an executable callback object; and the first conditional-update response corresponds to a result generated based on execution of the callback object.

8. A computer system, comprising:

one or more processors;

memory; and one or more programs, wherein the one or more programs are stored in the memory and configured to be executed by the one or more processors, the one or more programs including instructions for:
   detecting a request, received from a requestor, to access a first data object stored in a tiered data structure, the tiered data structure stored in one or more memory devices, wherein the tiered data structure includes a plurality of internal nodes and a plurality of leaf nodes, and wherein the request comprises a conditional request to modify the first data object;
   in response to detecting the request to access the first data object:
      retrieving a leaf node that includes the first data object, wherein the leaf node is a leaf node in the tiered data structure; and
      locking the leaf node that includes the first data object;
   while the leaf node that includes the first data object is locked:
      transmitting, to the requestor, a first conditional-update communication that includes an indication of a current value of the first data object;
      detecting a first conditional-update response to the first conditional-update communication, the detected first conditional-update response received from the requestor and corresponding to the first data object; and
      in response to detecting the first conditional-update response, performing one or more operations based on the first conditional-update response; and
   after performing the one or more operations based on the first conditional-update response, unlocking the leaf node that includes the first data object.

9. The computer system of claim 8, wherein two or more of the plurality of leaf nodes each include multiple data objects, each of the data objects including unique key information and a corresponding value.

10. The computer system of claim 8, wherein the leaf node that includes the first data object is write-locked while the first conditional-update communication is transmitted and the first conditional-update response is detected.

11. The computer system of claim 8, wherein:

retrieving the leaf node includes traversing the tiered data structure by navigating through one or more internal nodes to the leaf node that includes the first data object; and the one or more programs further include instructions for:
   read-locking the one or more internal nodes that were traversed to reach the leaf node that includes the first data object after traversing through the one or more internal nodes.

12. The computer system of claim 8, wherein:

the first conditional-update communication provides information that enables the requestor to determine whether or not to update the value of the first data object based on the current value of the first data object; and performing the one or more operations based on the first conditional-update response includes:
   updating the value of the first data object in accordance with the first conditional-update response in accordance with a determination that the first conditional-update response includes a request to update the value of the first data object; and
   forgoing updating the value of the first data object in accordance with a determination that the first conditional-update response does not include a request to update the value of the first data object.

13. The computer system of claim 8, wherein:

the request to access the first data object identifies a plurality of data objects including the first data object and a second data object, wherein the leaf node that includes the first data object also includes the second data object;

while the leaf node that includes the first data object is locked, and after performing the one or more operations based on the first conditional-update response, the one or more programs further include instructions for:

transmitting, to the requestor, a second conditional-update communication that includes an indication of a current value of the second data object;

detecting a second conditional-update response to the second conditional-update communication, the detected second response received from the requestor and corresponding to the second data object; and performing one or more operations based on the second conditional-update response in response to detecting the second conditional-update response; and wherein the leaf node that includes the first data object and second data object is unlocked after the one or more operations based on the second conditional-update response are performed.

14. The computer system of claim 8, wherein:
the first conditional-update communication includes an executable callback object; and
the first conditional-update response corresponds to a result generated based on execution of the callback object.

15. A non-transitory computer readable storage medium storing one or more programs, the one or more programs comprising instructions, which when executed by a computer system with one or more processors, cause the computer system to:

detect a request, received from a requestor, to access a first data object stored in a tiered data structure, the tiered data structure stored in one or more memory devices, wherein the tiered data structure includes a plurality of internal nodes and a plurality of leaf nodes, and wherein the request comprises a conditional request to modify the first data object;

in response to detecting the request to access the first data object:

retrieve a leaf node that includes the first data object, wherein the leaf node is a leaf node in the tiered data structure; and lock the leaf node that includes the first data object;

while the leaf node that includes the first data object is locked:

transmit, to the requestor, a first conditional-update communication that includes an indication of a current value of the first data object;

detect a first conditional-update response to the first conditional-update communication, the detected first conditional-update response received from the requestor and corresponding to the first data object; and in response to detecting the first conditional-update response, perform one or more operations based on the first conditional-update response; and after performing the one or more operations based on the first conditional-update response, unlock the leaf node that includes the first data object.

16. The non-transitory computer readable storage medium of claim 15, wherein two or more of the plurality of leaf nodes each include multiple data objects, each of the data objects including unique key information and a corresponding value.

17. The non-transitory computer readable storage medium of claim 15, wherein the leaf node that includes the first data object is write-locked while the first conditional-update communication is transmitted and the first conditional-update response is detected.

18. The non-transitory computer readable storage medium of claim 15, wherein:

retrieving the leaf node includes traversing the tiered data structure by navigating through one or more internal nodes to the leaf node that includes the first data object; and the one or more programs further comprise instructions which cause the computer system to:

read-lock the one or more internal nodes that were traversed to reach the leaf node that includes the first data object after traversing through the one or more internal nodes.

19. The non-transitory computer readable storage medium of claim 15, wherein:

the first conditional-update communication provides information that enables the requestor to determine whether or not to update the value of the first data object based on the current value of the first data object; and performing the one or more operations based on the first conditional-update response includes:

updating the value of the first data object in accordance with the first conditional-update response in accordance with a determination that the first conditional-update response includes a request to update the value of the first data object; and forgoing updating the value of the first data object in accordance with a determination that the first conditional-update response does not include a request to update the value of the first data object.

20. The non-transitory computer readable storage medium of claim 15, wherein:

the request to access the first data object identifies a plurality of data objects including the first data object;

while the leaf node that includes the first data object is locked, and after performing the one or more operations based on the first conditional-update response corresponding to the first data object, the one or more programs further comprise instructions which cause the computer system to:

transmit, to the requestor, a second conditional-update communication that includes an indication of a current value of the second data object;

detect a second conditional-update response to the second conditional-update communication, the detected second response received from the requestor and corresponding to the second data object; and perform one or more operations based on the second conditional-update response in response to detecting the second conditional-update response; and wherein the leaf node that includes the first data object and second data object is unlocked after the one or more operations based on the second conditional-update response are performed.

21. The non-transitory computer readable storage medium of claim 15, wherein:

the first conditional-update communication includes an executable callback object; and the first conditional-update response corresponds to a result generated based on execution of the callback object.

\* \* \* \* \*